US008279885B2

(12) United States Patent
Riddle

(10) Patent No.: US 8,279,885 B2
(45) Date of Patent: *Oct. 2, 2012

(54) LOCKLESS PROCESSING OF COMMAND OPERATIONS IN MULTIPROCESSOR SYSTEMS

(75) Inventor: Guy Riddle, Los Gatos, CA (US)

(73) Assignee: Packeteer, Inc., Sunnyvale, CA (US)

( * ) Notice: Subject to any disclaimer, the term of this patent is extended or adjusted under 35 U.S.C. 154(b) by 1345 days.

This patent is subject to a terminal disclaimer.

(21) Appl. No.: 11/861,049

(22) Filed: Sep. 25, 2007

(65) Prior Publication Data

US 2009/0083517 A1 Mar. 26, 2009

(51) Int. Cl.
H04L 12/28 (2006.01)

(52) U.S. Cl. ............ 370/412; 370/389; 710/52; 710/68; 711/110; 711/129; 711/130; 711/154; 711/170; 718/100; 707/687; 707/693

(58) Field of Classification Search .................. None
See application file for complete search history.

(56) References Cited

U.S. PATENT DOCUMENTS

| 6,182,146 | B1 | 1/2001 | Graham-Cumming, Jr. | |
|---|---|---|---|---|
| 6,493,800 | B1 | 12/2002 | Blumrich | |
| 6,621,792 | B1 | 9/2003 | Petty | 370/230 |
| 6,639,910 | B1 | 10/2003 | Provencher et al. | 370/351 |
| 7,028,098 | B2 | 4/2006 | Mate et al. | 709/238 |
| 7,447,872 | B2 | 11/2008 | Schroter et al. | |
| 7,643,496 | B1 | 1/2010 | Jamieson | |
| 2001/0055276 | A1 | 12/2001 | Rogers et al. | |
| 2002/0141425 | A1 | 10/2002 | Merani | |
| 2002/0143939 | A1 | 10/2002 | Riddle et al. | |
| 2004/0131079 | A1 | 7/2004 | Hegde et al. | |
| 2004/0218561 | A1 | 11/2004 | Obuchi et al. | |
| 2006/0056406 | A1 | 3/2006 | Bouchard et al. | |
| 2006/0059286 | A1 | 3/2006 | Bertone et al. | |
| 2006/0059316 | A1 | 3/2006 | Asher et al. | |
| 2006/0095741 | A1 | 5/2006 | Asher et al. | |
| 2006/0230167 | A1 | 10/2006 | Watanabe et al. | |
| 2007/0121499 | A1 | 5/2007 | Pal | |
| 2008/0239956 | A1 | 10/2008 | Okholm et al. | |
| 2008/0316922 | A1 | 12/2008 | Riddle et al. | |
| 2009/0003204 | A1 | 1/2009 | Okholm et al. | |
| 2009/0161547 | A1 | 6/2009 | Riddle | |

FOREIGN PATENT DOCUMENTS

KR 10-2001-0085057 9/2001
WO WO 00/60590 10/2000

OTHER PUBLICATIONS

U.S. Appl. No. 10/158,768, filed May 30, 2002, Schroter, et al.
Lee, et. al., "NpBench: A Benchmark Suite for Control plane and Data plane Appications for Network Processors," Proceedings of the 21$^{st}$ International Conference on Computer Design (ICCD '03) IEEE 2003.

(Continued)

Primary Examiner — Robert Scheibel
Assistant Examiner — Gautam Sharma
(74) Attorney, Agent, or Firm — Baker Botts L.L.P.

(57) ABSTRACT

A beltway mechanism that takes advantage of atomic locking mechanisms supported by certain classes of hardware processors to handle the tasks that require atomic access to data structures while also reducing the overhead associated with these atomic locking mechanisms. The beltway mechanisms described herein can be used to control access to software and hardware facilities in an efficient manner.

20 Claims, 17 Drawing Sheets

OTHER PUBLICATIONS

Herbert Bros, et. al., "FFPF: Fairly Fast Packet Filters," Vrije Universiteit Amsterdam, The Netherlands, dowloaded on Jun. 1, 2007.

White Paper, "Network Processor Designs for Next-Generation Networking Equipment," EZchip Technologies, Dec. 27, 1999.

Lecture 14, G22.2243-001, "High Performance Computer Architecture," Stream Processing Architectures, Dec. 7, 2004.

Herlihy, et. al., "Obstruction-Free Synchronization: Double-Ended Queues as an Example," Brown University, downloaded on Jun. 1, 2007.

Barth, P., "Using Atomic Data Structures for Parallel Simulation," CSAIL, Massachusetts Institute of Technology, Apr. 27, 1992.

RTC Magazine, "Communications Processors vs. Network Processors: Programmable Data Plane Approaches," RTC Group, May 31, 2007.

Kumar, R., "Holistic Design for Multi-core Architectures," thesis, University of California, San Diego, 2006.

De Bruijn, et. al., "Using Beltway Buffers for efficient and structure I/O," Brije Universiteit Amsterdam, Technical Report IR-CS-028, Sep. 2006.

"Cavium OCTEON multi-core Network Service Processor," Cavium Oocteon, Cavium Networks, downloaded May 31, 2007.

Nguyen, et. al., "Path Diversity and Bandwidth Allocation for Multimedia Streaming," University of California, Berkeley, downloaded May 31, 2007.

"Introduction to Internet Quality of Service (QoS)," downloaded May 31, 2007.

Discolo, et. al., "Lock Free Data Structures using STM in Haskell," Microsoft, downloaded Jun. 5, 2007.

Michael, et. al., "Simple, Fast, and Practical Non-Blocking and Blocking Concurrent Queue Algorithms," University of Rochester, downloaded Jun. 1, 2007.

Feldman, M., "Getting Serious About Transactional Memory," HPC Wire, Jan. 12, 2007.

Office Action for U.S. Appl. No. 11/766,634 dated Jan. 25, 2010.

Office Action for U.S. Appl. No. 11/694,703 dated Mar. 23, 2010.

Riddle, "Office Action," U.S. Appl. No. 11/766,634, United States Patent and Trademark Office, sent Jul. 8, 2009, 26 pages.

PCT/US2008/058390, International Search Report, Oct. 30, 2008.

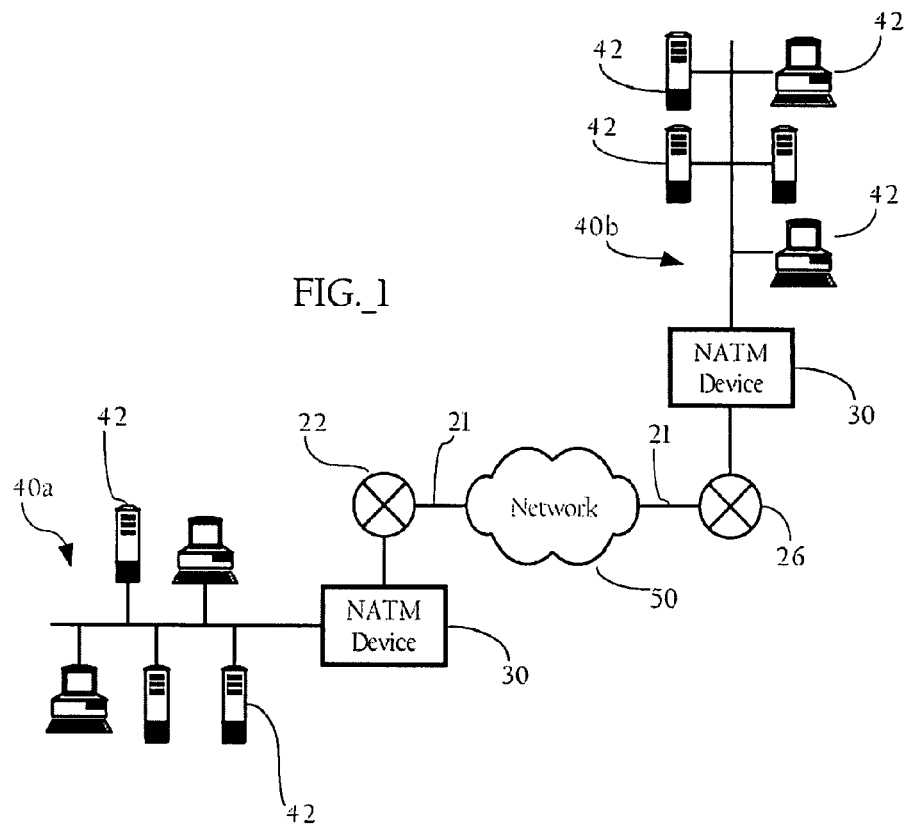
FIG._1
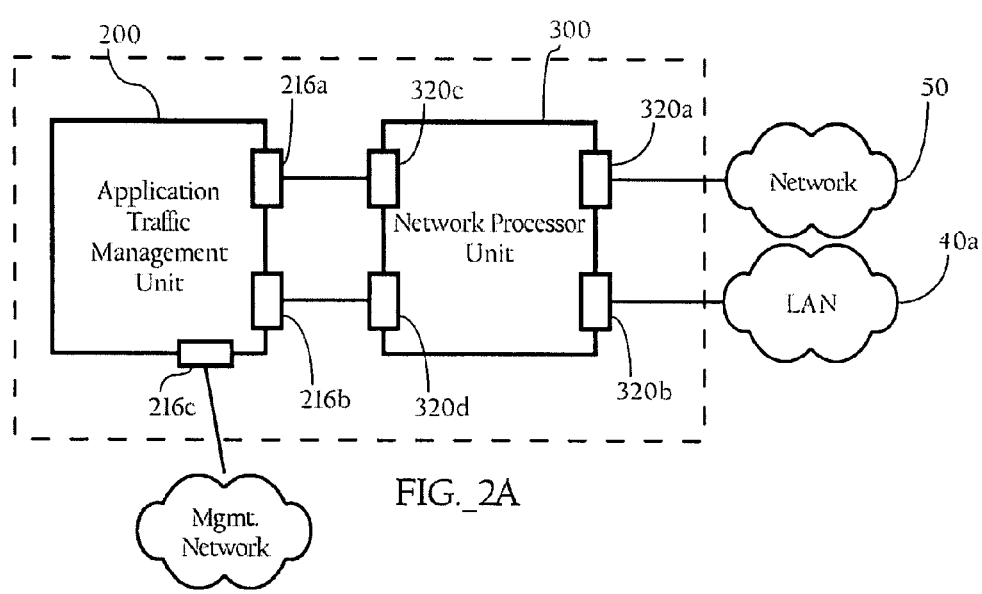
FIG._2A

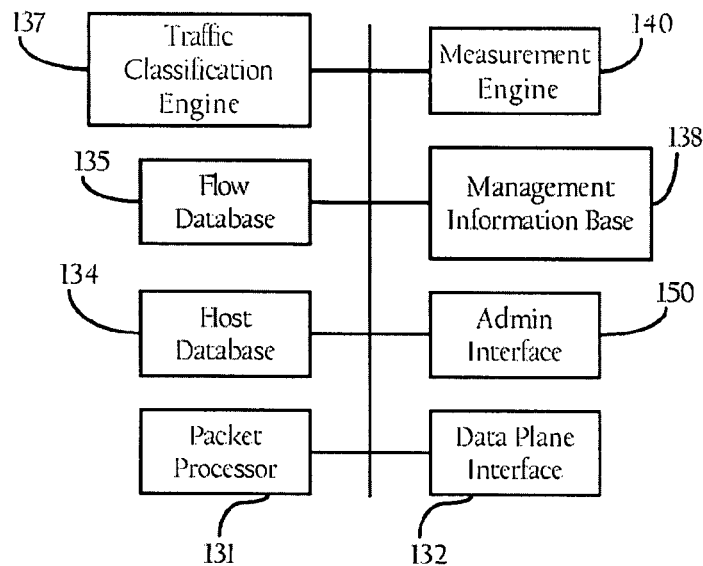
FIG._4A
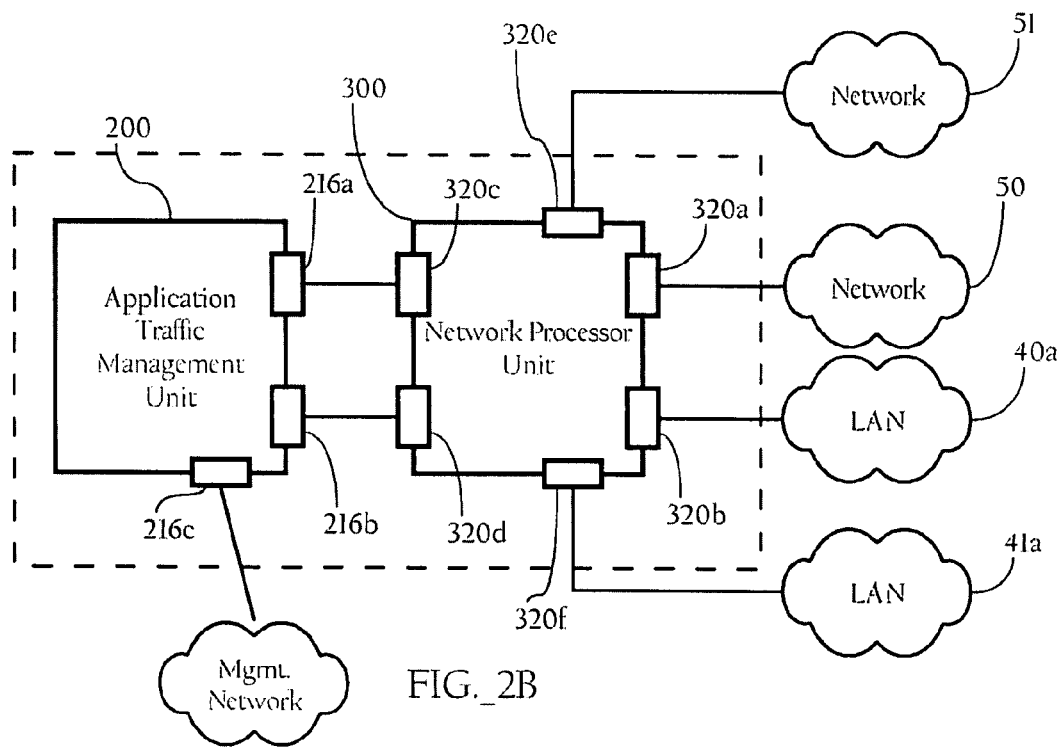
FIG._2B

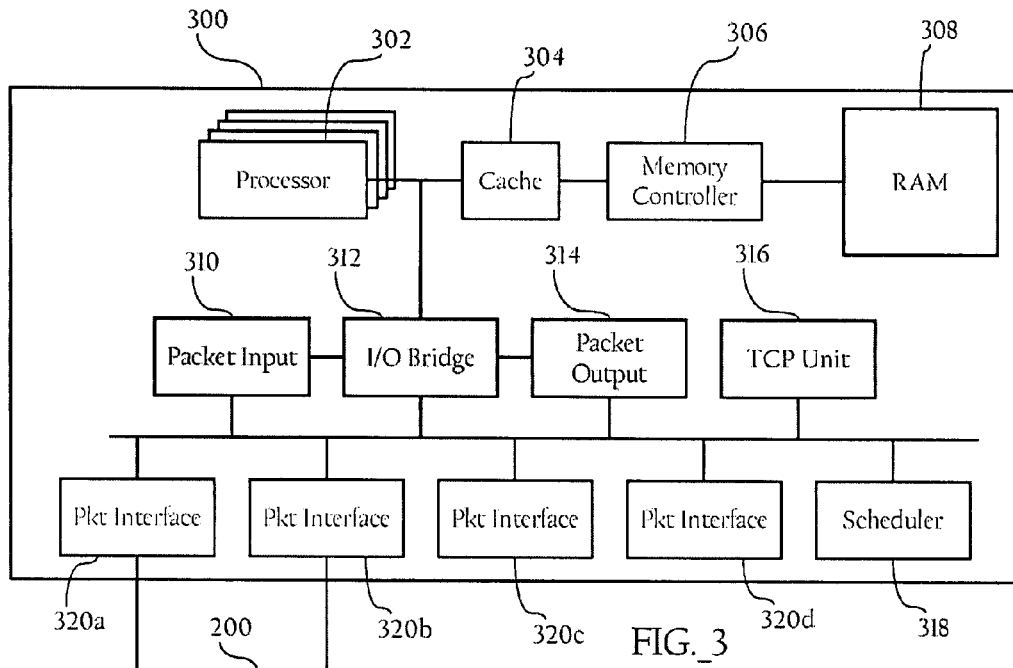
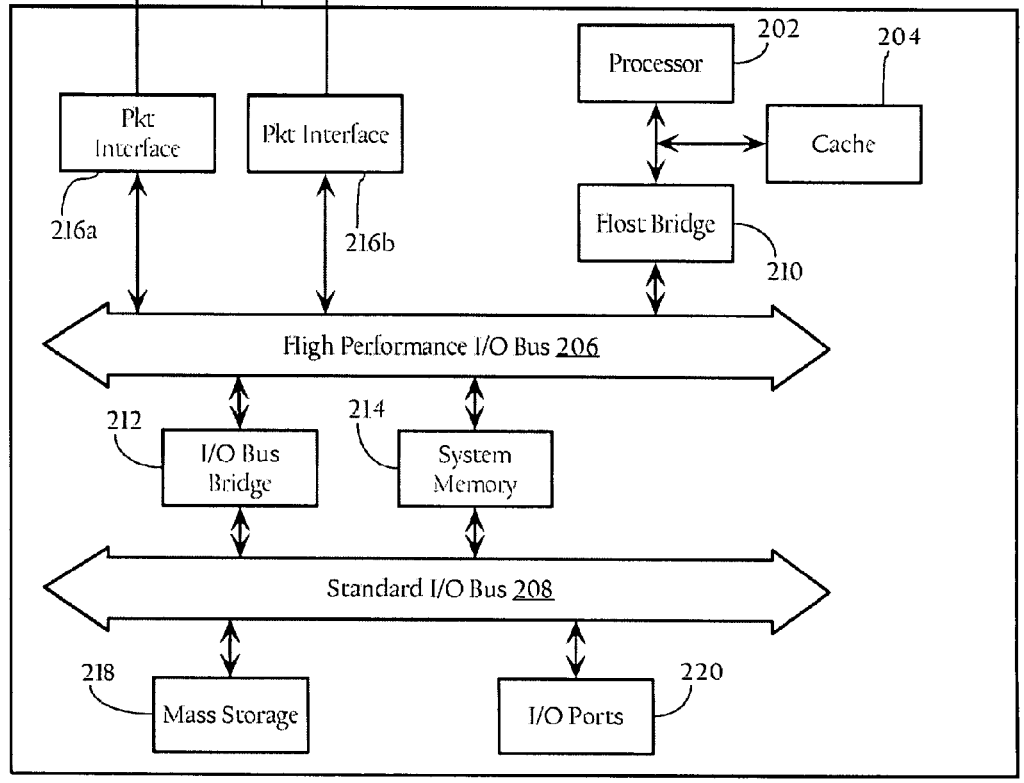
FIG._3

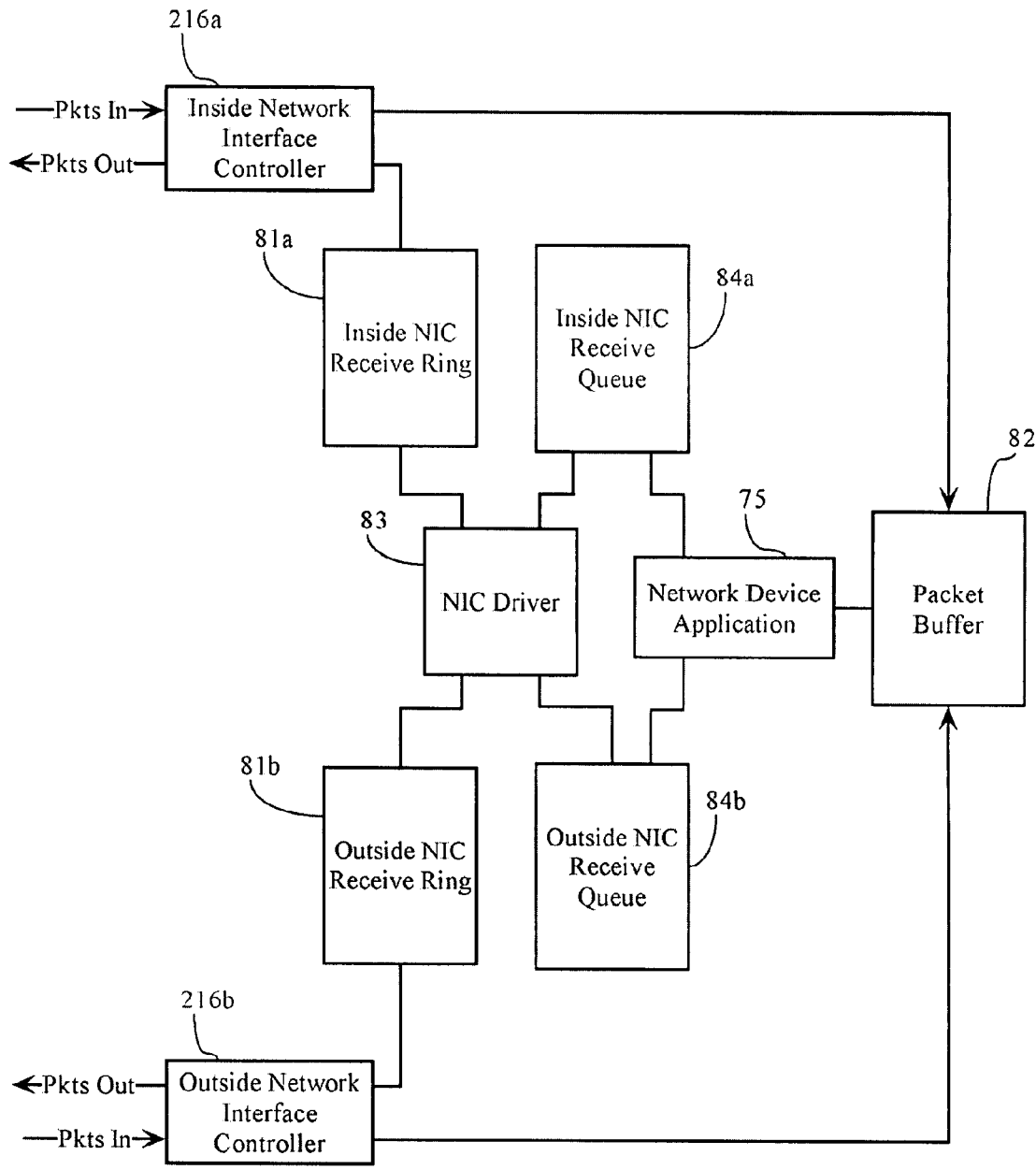
FIG._4B

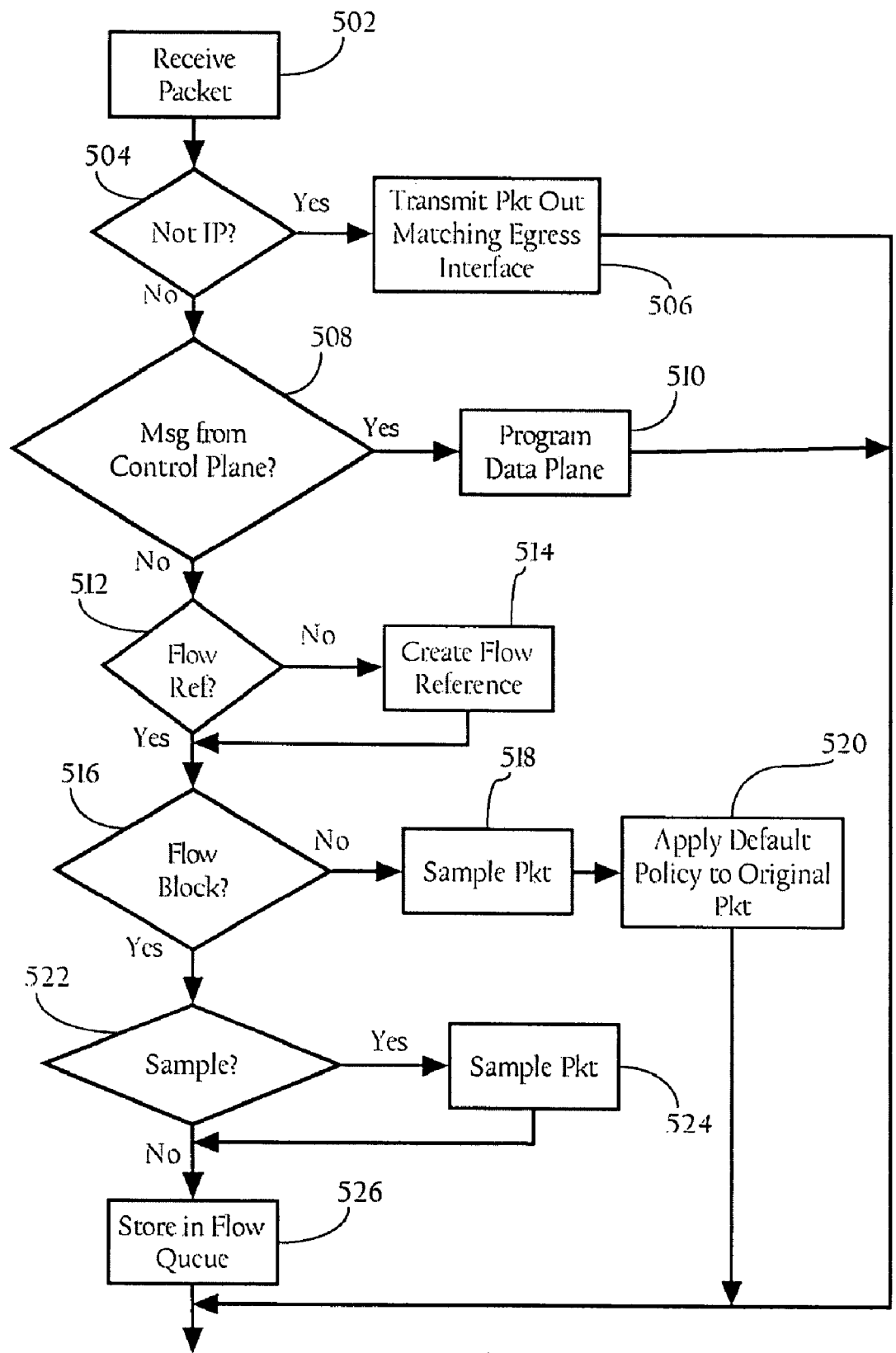
FIG._5A

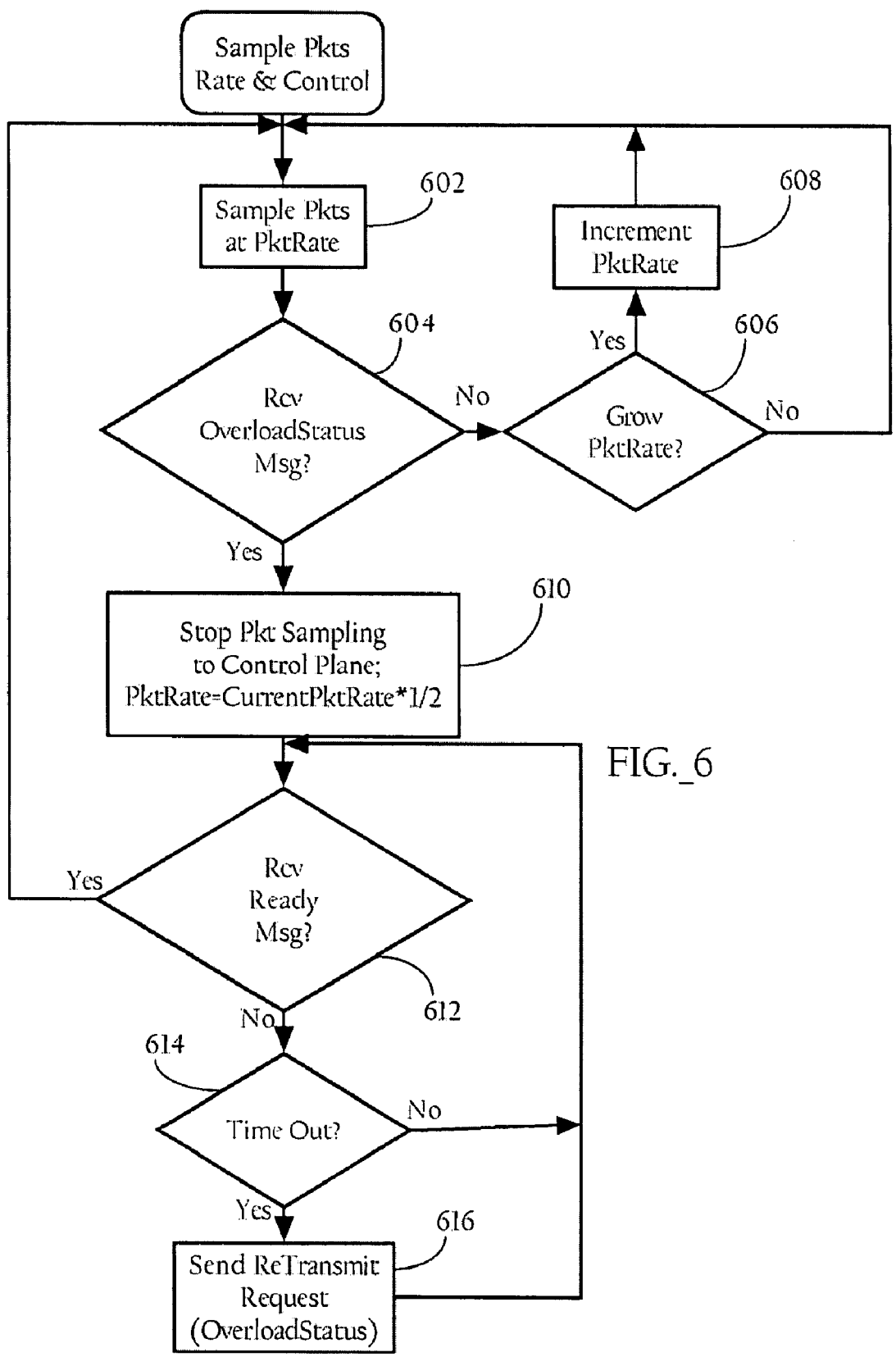
FIG._6

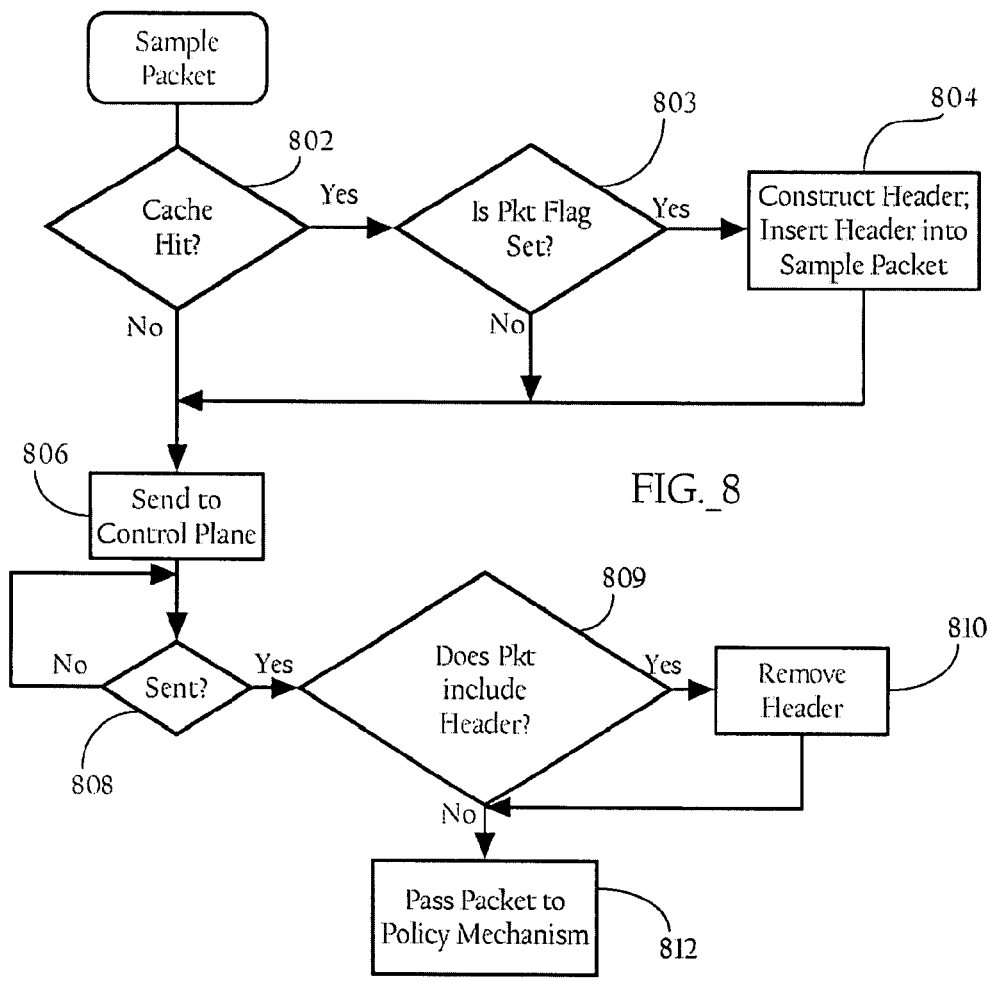
FIG._8
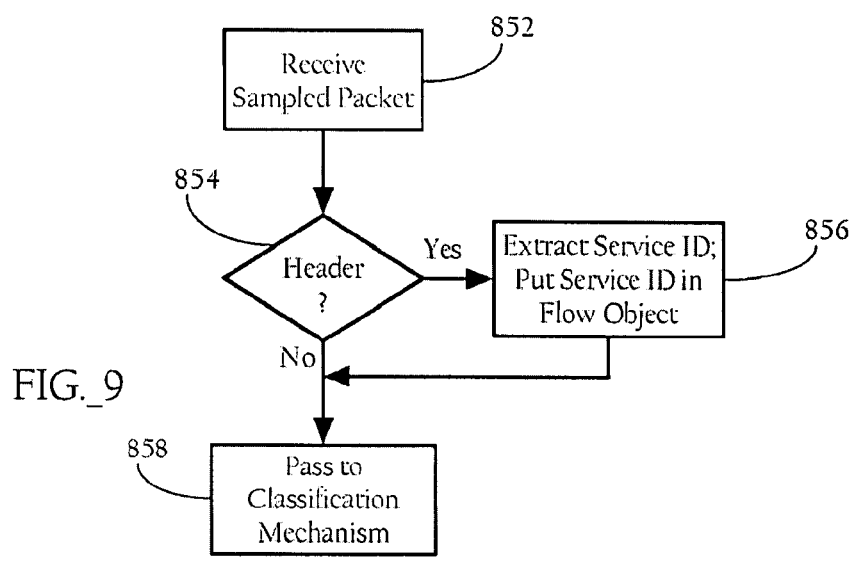
FIG._9

LOCKLESS PROCESSING OF COMMAND OPERATIONS IN MULTIPROCESSOR SYSTEMS

CROSS-REFERENCE TO RELATED APPLICATIONS

This application makes reference to the following commonly owned U.S. patent applications and patents, which are incorporated herein by reference in their entirety for all purposes:

U.S. patent application Ser. No. 08/762,828 now U.S. Pat. No. 5,802,106 in the name of Robert L. Packer, entitled "Method for Rapid Data Rate Detection in a Packet Communication Environment Without Data Rate Supervision;"

U.S. patent application Ser. No. 08/970,693 now U.S. Pat. No. 6,018,516, in the name of Robert L. Packer, entitled "Method for Minimizing Unneeded Retransmission of Packets in a Packet Communication Environment Supporting a Plurality of Data Link Rates;"

U.S. patent application Ser. No. 08/742,994 now U.S. Pat. No. 6,038,216, in the name of Robert L. Packer, entitled "Method for Explicit Data Rate Control in a Packet Communication Environment without Data Rate Supervision;"

U.S. patent application Ser. No. 09/977,642 now U.S. Pat. No. 6,046,980, in the name of Robert L. Packer, entitled "System for Managing Flow Bandwidth Utilization at Network, Transport and Application Layers in Store and Forward Network;"

U.S. patent application Ser. No. 09/106,924 now U.S. Pat. No. 6,115,357, in the name of Robert L. Packer and Brett D. Galloway, entitled "Method for Pacing Data Flow in a Packet-based Network;"

U.S. patent application Ser. No. 09/046,776 now U.S. Pat. No. 6,205,120, in the name of Robert L. Packer and Guy Riddle, entitled "Method for Transparently Determining and Setting an Optimal Minimum Required TCP Window Size;"

U.S. patent application Ser. No. 09/479,356 now U.S. Pat. No. 6,285,658, in the name of Robert L. Packer, entitled "System for Managing Flow Bandwidth Utilization at Network, Transport and Application Layers in Store and Forward Network;"

U.S. patent application Ser. No. 09/198,090 now U.S. Pat. No. 6,412,000, in the name of Guy Riddle and Robert L. Packer, entitled "Method for Automatically Classifying Traffic in a Packet Communications Network;"

U.S. patent application Ser. No. 10/015,826 now U.S. Pat. No. 7,013,342 in the name of Guy Riddle, entitled "Dynamic Tunnel Probing in a Communications Network;"

U.S. patent application Ser. No. 10/039,992 now U.S. Patent No. 7,032,072, in the name of Michael J. Quinn and Mary L. Laier, entitled "Method and Apparatus for Fast Lookup of Related Classification Entities in a Tree-Ordered Classification Hierarchy;"

U.S. patent application Ser. No. 10/155,936 now U.S. Pat. No. 6,591,299, in the name of Guy Riddle, Robert L. Packer, and Mark Hill, entitled "Method For Automatically Classifying Traffic With Enhanced Hierarchy In A Packet Communications Network;"

U.S. patent application Ser. No. 09/206,772, now U.S. Patent No. 6,456,360, in the name of Robert L. Packer, Brett D. Galloway and Ted Thi, entitled "Method for Data Rate Control for Heterogeneous or Peer Internetworking;"

U.S. patent application Ser. No. 09/198,051, in the name of Guy Riddle, entitled "Method for Automatically Determining a Traffic Policy in a Packet Communications Network;"

U.S. patent application Ser. No. 09/966,538, in the name of Guy Riddle, entitled "Dynamic Partitioning of Network Resources;"

U.S. patent application Ser. No. 11/053,596 in the name of Azeem Feroz, Wei-Lung Lai, Roopesh R. Varier, James J. Stabile, and Jon Eric Okholm, entitled "Aggregate Network Resource Utilization Control Scheme;"

U.S. patent application Ser. No. 10/108,085, in the name of Wei-Lung Lai, Jon Eric Okholm, and Michael J. Quinn, entitled "Output Scheduling Data Structure Facilitating Hierarchical Network Resource Allocation Scheme;"

U.S. patent application Ser. No. 10/236,149, in the name of Brett Galloway and George Powers, entitled "Classification Data Structure enabling Multi-Dimensional Network Traffic Classification and Control Schemes;"

U.S. patent application Ser. No. 10/334,467, in the name of Mark Hill, entitled "Methods, Apparatuses and Systems Facilitating Analysis of the Performance of Network Traffic Classification Configurations;"

U.S. patent application Ser. No. 10/453,345, in the name of Scott Hankins, Michael R. Morford, and Michael J. Quinn, entitled "Flow-Based Packet Capture;"

U.S. patent application Ser. No. 10/676,383 in the name of Guy Riddle, entitled "Enhanced Flow Data Records Including Traffic Type Data;"

U.S. patent application Ser. No. 10/720,329, in the name of Weng-Chin Yung, Mark Hill and Alne Cesa Klein, entitled "Heuristic Behavior Pattern Matching of Data Flows in Enhanced Network Traffic Classification;"

U.S. patent application Ser. No. 10/812,198 in the name of Michael Robert Morford and Robert E. Purvy, entitled "Adaptive, Application-Aware Selection of Differentiated Network Services;"

U.S. patent application Ser. No. 10/843,185 in the name of Guy Riddle, Curtis Vance Bradford and Maddie Cheng, entitled "Packet Load Shedding;"

U.S. patent application Ser. No. 10/917,952 in the name of Weng-Chini Yung, entitled "Examination of Connection Handshake to Enhance Classification of Encrypted Network Traffic;"

U.S. patent application Ser. No. 10/938,435 in the name of Guy Riddle, entitled "Classification and Management of Network Traffic Based on Attributes Orthogonal to Explicit Packet Attributes;"

U.S. patent application Ser. No. 11/019,501 in the name of Suresh Muppala, entitled "Probing Hosts Against Network Application Profiles to Facilitate Classification of Network Traffic;"

U.S. patent application Ser. No. 11/027,744 in the name of Mark Urban, entitled "Adaptive Correlation of Service Level Agreement and Network Application Performance;"

U.S. patent application Ser. No. 11/241,007 in the name of Guy Riddle, entitled "Partition Configuration and Creation Mechanisms for Network Traffic Management Devices;" and U.S. patent application Ser. No. 11/694,703, entitled "Data and Control Plane Architecture for Network Application Traffic Management Device", filed on Mar. 30, 2007.

TECHNICAL FIELD

The present disclosure relates to atomic process scheduling in multiprocessor systems.

BACKGROUND

Some networking equipment has both control and data planes. The control plane constitutes the logical and physical interfaces that do not themselves transport network data but that set up, monitor, and control the activities of silicon that does. In some designs for network processing units (NPUs), an application executes on an operating system such as Linux on the control-plane CPU, governing the operation and performing housekeeping activities on behalf of packet engines, e.g., multi-core processors that receive and forward Internet Protocol packets. The connection between the control-plane CPU and the data/forwarding plane packet engines can be as intimate as a local-bus connection to a coprocessor, as straightforward as standard PCI, or as arm's length as Ethernet or application-specific network fabric.

In the case of a local bus or of PCI, the control processor can treat the forwarding/data plane processors as specialized peripherals that present, superficially, regular memory-mapped interfaces. In the case of a networked connection between the planes, the fabric interface requires a generic driver (for Ethernet, asynchronous transfer mode, etc.), over which specialized command packets are sent to control the packet processor.

Off-the-shelf NPUs strive to integrate high networking functionality closely tied to the control CPU with local connections. Some early designs, however, have suffered from bandwidth limitations at the control point and in the data plane—data packets can face significant bottlenecks in moving both to and from the control plane, as well as among parallel packet engines within the NPU. Moreover, NPUs with powerful and complex packet-engine sets have proven to be difficult to program. See generally, "Linux is on the NPU Control Plane" by Bill Weinberg, EETimes (posted Feb. 5, 2004).

A "partition" is a term used in network traffic shaping. A partition manages bandwidth for a traffic class' aggregate flows, so that all of the flows for the class are controlled together as one. A "flow" is a specific instance of a connection, session, or packet-exchange activity between hosts. And a "traffic class" is a logical grouping of traffic flows that share the same characteristics—a specific application, protocol, address, or set of addresses.

One can use partitions to: (a) protect mission-critical traffic by guaranteeing that a traffic class always gets a defined amount of bandwidth; (b) limit aggressive, non-critical traffic by allowing that traffic class to consume only a defined amount of bandwidth; (c) divide capacity; and (d) assign bandwidth dynamically to users.

All partitions are defined as hierarchical—that is, partitions can contain partitions. This hierarchical approach enables application management for multiple groups, while controlling the group as a whole. For example, an ISP can subdivide a subscriber's partition with child partitions for each of the subscriber's departments. See generally, Packeteer's Packet Guide for PacketWise.

The token bucket algorithm is an algorithm for network traffic shaping or rate limiting. Typically, a token bucket algorithm is used to control the amount of data that is injected into a network, allowing for "bursts" of data to be sent. A related algorithm is the leaky bucket algorithm. The two algorithms differ principally in that the leaky bucket algorithm imposes a hard limit on the data transmission rate, whereas the token bucket algorithm imposes a limit on the average data transmission rate.

Conceptually, the token bucket algorithm employs a token bucket which contains tokens, each of which might represent a unit of bytes. The network administrator specifies for the algorithm how many tokens are needed to transmit how many bytes and a capacity for the token bucket, say b tokens. Then in some embodiments (e.g., those that transmit packets), the algorithm proceeds as follows: (1) a token is added to the bucket every 1/r seconds for some constant rate r; (2) since the bucket can hold at most b tokens, if a token arrives when the bucket is full, the token is discarded; (3) when a packet of n bytes arrives, n tokens are removed from the bucket, and the packet is sent to the network; and (4) if fewer than n tokens are available, no tokens are removed from the bucket, and the packet is considered to be non-conformant.

The algorithm allows bursts of up to b bytes, but over the long run the output of conformant packets is limited to the constant rate, r. A non-conformant packet might be treated in one of the following ways: (a) it might be dropped; (b) it might be enqueued for subsequent transmission when sufficient tokens have accumulated in the bucket; or (c) it might be transmitted, but marked as being non-conformant, possibly to be dropped subsequently if the network is overloaded.

Hierarchical token bucket (HTB) is a variation on the token bucket algorithm. HTB was implemented by Martin Devera as part of the Linux kernel; the Linux man page for HTB is tc-htb(8). As its name suggests, HTB involves a number of token buckets arranged in a hierarchy. Devera's implementation apparently builds upon the three-color token bucket algorithm described in RFC 2697, A Single Rate Three Color Marker, (September 1999), published by the Internet Engineering Task Force (IETF).

The traditional approach to multi-threaded and multi-process programming is to use locks to synchronize access to shared resources. Synchronization primitives such as mutexes, semaphores, and critical sections are all mechanisms by which a programmer can ensure that certain sections of code do not execute concurrently if doing so would corrupt shared memory structures. If one thread or process attempts to acquire a lock that is already held by another thread, the thread will block until the lock is free.

In contrast to algorithms that protect access to shared data with locks, lock-free algorithms are specially designed to allow multiple threads to read and write shared data concurrently without corrupting it. "Lock-free" refers to the fact that no synchronization primitives such as mutexes or semaphores are involved. Writing a program that uses lock-free data structures is not simply a matter of rewriting the algorithms one would normally protect with a mutex to be lock-free. Because lock-free algorithms are so difficult to write, researchers focus on writing lock-free versions of basic data structures such as stacks, queues, sets, and bash tables. These allow programs to exchange data between threads or processes asynchronously. Typically, lock-free algorithms are written using atomic primitives that the hardware provides. One such primitive is a producer-consumer ring with begin and end pointers, where the producer only updates end pointers after it writes an entry to the ring, and the consumers only update begin pointers after it consumes an entry from the ring. Other hardware-based atomic queuing mechanisms are typically available in multicore processing environments.

SUMMARY

In particular embodiments, the present invention provides methods, apparatuses, and systems directed to efficient processing of commands and other operations requiring atomic or exclusive access to data structures in multiple processor environments. The present invention provides methods, apparatuses, and systems directed to a beltway mechanism that takes advantage of atomic locking mechanisms supported by certain classes of hardware processors to handle the tasks that require atomic access to data structures while also reducing the overhead associated with these atomic locking mechanisms. The beltway mechanisms described herein can be used to control access to software and hardware facilities in an efficient manner.

As an overview, an instance of a beltway can be implemented around a given task, such as writing packets to a specific output port or specific group of output ports, setting a hardware-based timer, using hardware-based compression logic, etc. An instance of a beltway data structure is created for each such task. Relative to each task, the beltway data structure includes a set of circular buffers or rings, and global variables that point to consumer processes or contain state information of the particular beltway instance. In the implementation described herein, the number of circular buffers or rings of a given beltway instance equals the number of processors of the data plane hardware. In addition, so-called producer functions, when called, add entries to the beltway data structure, while a so-called consumer process reads entry from the beltway data structure and calls a consumer function associated with the beltway data structure for processing of the entry. In particular embodiments, the present invention facilitates implementation of hierarchical bandwidth partitions in multiple processor environments.

DESCRIPTION OF THE DRAWINGS

FIG. 1 is a schematic diagram illustrating a computer network environment in which implementations of the invention may operate.

FIGS. 2A and 2B are schematic diagrams illustrating the interconnections between a network application traffic management device and a network processing unit according to particular implementations of the invention.

FIG. 3 is a functional block diagram that shows the components and system architecture of a network application traffic management device and a network processing unit according to one particular implementation of the invention.

FIG. 4A is a schematic diagram illustrating logical processing modules of an application traffic management device according to one particular implementation of the invention.

FIG. 4B is a functional block diagram illustrating a process flow, according to one implementation of the present invention, among various hardware and software modules of a network application traffic management unit.

FIG. 5A is a flow chart setting forth a method, according to one possible implementation of the invention, directed to processing flows at a network processing unit.

FIG. 6 is a state diagram, according to a particular implementation of the invention, directed to controlling the sampling of packets, and the rate at which packets are sampled, to a network application traffic management device.

FIG. 8 is a flow chart setting forth an example method directed to sampling packets to a control plane.

FIG. 9 is a flow chart illustrating an example method directed to processing received packets sampled by a data plane.

DESCRIPTION OF EXAMPLE EMBODIMENT(S)

Figure 5B:
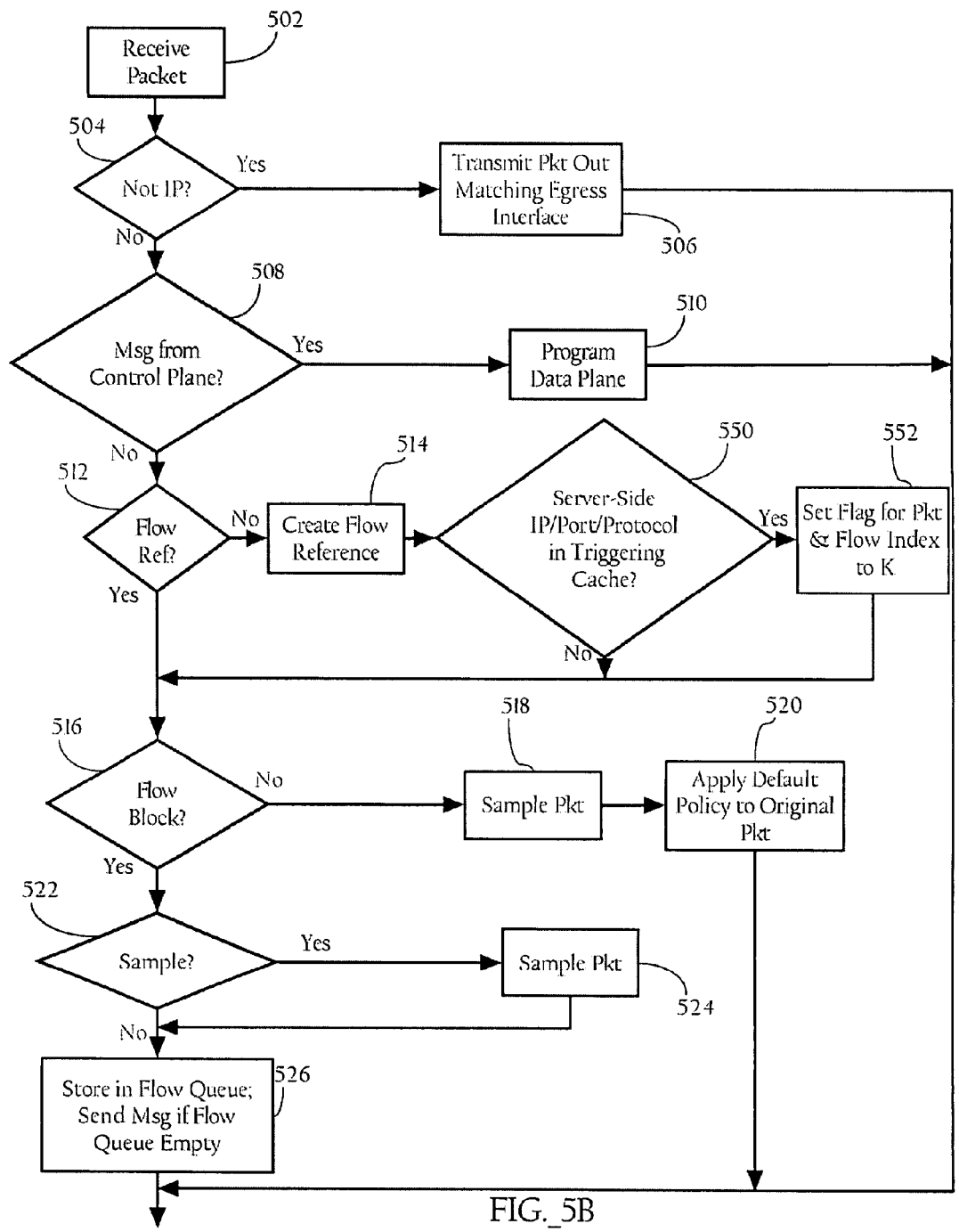
FIG. 5B is a flow chart illustrating another example method directed to processing flows at a network processing unit.

The following example embodiments are described and illustrated in conjunction with apparatuses, methods, and systems which are meant to be examples and illustrative, not limiting in scope.

A. Network Environment

FIG. 1 illustrates, for didactic purposes, a network 50, such as wide area network, interconnecting a first network 40a, supporting a central operating or headquarters facility (for example), and a second network 40b, supporting a branch office facility (for example). In one implementation, network 50 may include a MPLS VPN network core interconnecting networks 40a and 40b. Network 50 may also be operably connected to other networks associated with the same administrative domain as networks 40a, 40b, or a different administrative domain. Furthermore, network 50 may allow access to a variety of hosts over the Internet, as well. As FIG. 1 shows, the first network 40a interconnects several hosts or end systems 42, including personal computers and servers, and provides access to resources operably connected to computer network 50 via router 22 and access link 21. Access link 21 is a physical and/or logical connection between two networks, such as computer network 50 and network 40a. The computer network environment, including network 40a and network 50 is a packet-based communications environment, employing TCP/IP protocols (for example), and/or other suitable protocols, and has a plurality of interconnected digital packet transmission stations or routing nodes. First network 40a, and network 40b, can each be a local area network, a wide area network, combinations thereof, or any other suitable network.

As FIG. 1 illustrates, network devices 30, in one implementation, are deployed at the respective edges of networks 40a and 40b. In a particular implementation, network devices 30 are network application traffic management devices operative to manage network application traffic. As discussed below, network application traffic management devices 30 may include a number of different functional modules, such as compression modules, tunneling modules, rate control modules, gateway modules, protocol acceleration modules, and the like. In addition, network application traffic management devices 30 may include functions, such as compression and/or tunneling, where cooperation with a remote device (such as another network application traffic management device) is required, while also performing other functions that can be performed independently. However, the control and data plane system architecture according to the present invention can be integrated into a variety of network devices, such as proxies, firewalls, intrusion detection systems, packet capture or network monitoring equipment, VPN servers, web services network gateways or brokers, and the like.

A.1. Example System Architecture

FIG. 2A illustrates an example system architecture of network application traffic management device 30. In the implementation shown, network application traffic management device 30 comprises an application traffic management unit 200 and a network processing unit 300. Network application traffic management unit 200 may be implemented using existing hardware device platforms and functionality with small software modifications to interact with network processing unit 300. Network processing unit 300 interconnects with application traffic management unit as shown, and is further operably connected to network 50 and LAN 40a. In the implementation shown, network processing unit 300 is a discrete processing unit that does not share memory with network application traffic management unit 200, instead being interconnected via one or more network interfaces. In other implementations, the interconnections between network processing unit 300 and network application traffic management unit 200 can be implemented using other suitable interface technologies, such as other network interface technologies, and bus interfaces (e.g., Peripheral Component Interconnect (PCI) interfaces, and Industry Standard Architecture (ISA) interfaces). Furthermore, network application traffic management unit 200 and network processing unit 300 may be directly interconnected to each other with only network cabling extending between the packet interfaces. In another implementation, the packet interfaces of the network application traffic management unit 200 and network processing unit 300 may be connected to an Ethernet switch or other network fabric. The devices could use layer 2 or 3 tunneling protocols to transmit sampled packets to each other.

As FIG. 2A illustrates network application traffic management unit 200 comprises packet interfaces 216a and 216b, while network processing unit 300 comprises packet interfaces 320a-d. In one implementation, packet interfaces comprise Ethernet interfaces including MAC layer functionality. However, other network interfaces can be used depending on the network environment. Generally, packets received from network 50 on packet interface 320a are transmitted to network 40a from packet interface 320b, and vice versa. Network processing unit 300, generally speaking, may be configured to implement one or more data plane operations on the network traffic transmitted between network 50 and network 40a according to a data plane configuration. As discussed in more detail below, network processing unit 300 is configured to receive packets from network 50 or 40a and selectively sample received packets to application traffic management unit 200 for processing. In one implementation, packets received on packet interface 320a, when sampled, are transmitted from packet interface 320c to packet interface 216a of network application traffic management unit 200. Network processing unit 300, in one implementation, then processes the packet without waiting for a response from network application traffic management unit 200. In a particular implementation, the network processing unit 300, given that it processes packets according to its current data plane configuration, can continue to process packets even when the control plane crashes and/or reboots. In addition, network application traffic management unit 200 may also be configured to emit probe messages and other messages directed to device discover, network management, and the like, directly as well. Application traffic management unit 200 performs various control plane operations on sampled packets, such as packet classification, policy identification, and the like.

Responsive to one or more received sample packets, network application traffic management unit 200 may transmit one or more control messages to network processing unit 300 operative to cause changes to the data plane configuration of the network processing unit. For example, network application traffic management unit 200 may receive sampled packets of a data flow, and classify them to identify one or more policies or controls. Network application traffic management unit 200 may then transmit a control message identifying one or more traffic classification or service types and one or more policies to be applied to packets of the data flow. Network processing unit 300 may then apply the one or more policies to subsequent packets of the same data flow.

Other implementations are possible. For example, network application traffic management unit 200 and network processing unit 300 could be connected using a single pair of packet interfaces. In other implementations, network application traffic management unit 200 and network processing unit 300 could be connected with additional packet interfaces than that shown in FIG. 2A. For example, a packet interface pair between network application traffic management unit 200 and network processing unit 300 could be configured for each packet interface of network processing unit 300 that is connected to a network, such as an internal LAN or a WAN. As FIG. 2B shows, in another implementation, network processing unit 300 could be configured with multiple packet interfaces 320a, 320b, 320e, and 320f for communication with respective networks 50, 40a, 51 & 41a, and multiplex packets transmitted to an network application traffic management unit 200 over a smaller number of packet interfaces 320c and 320d.

In yet another implementation, a single network application traffic management unit 200 can be connected to multiple network processing units 300 disposed at various points in a network environment. For example, two network processing units 300 could be deployed on separate access links, and communicably coupled to a single network application traffic management unit 200. Conversely, a single network processing unit 300 could be operably coupled to multiple application traffic management units 200. In one such implementation, the network processing unit can be configured to ensure that packets of the same flow are transmitted to the same network application traffic management 200.

A.1.a. Network Application Traffic Management Unit

While network application traffic management unit 200 may be implemented in a number of different hardware architectures, some or all of the elements or operations thereof may be implemented using a computing system having a general purpose hardware architecture such as the one in FIG. 3. In one implementation, network application traffic management unit 200 comprises a processor 202, a cache memory 204, and one or more software applications and drivers directed to the functions described herein. In one implementation, network application traffic management unit 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and one or more network/communication interfaces 216 couple to bus 206. Mass storage 218 and I/O ports 220 couple to bus 208. Collectively, these elements are intended to represent a broad category of computer hardware systems, including but not limited to general purpose computer systems based on the Pentium® processor manufactured by Intel Corporation of Santa Clara, Calif., as well as any other suitable processor.

Network interface 216c provides communication between network application traffic management unit 200 and a network through which a user may access management or reporting functions. Mass storage 218 provides permanent storage for the data and programming instructions to perform the above described functions implemented in the system controller, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to network application traffic management unit 200.

Network application traffic management unit 200 may include a variety of system architectures; and various components of network application traffic management unit 200 may be rearranged. For example, cache 204 may be on-chip with processor 202. Alternatively, cache 204 and processor 202 may be packed together as a "processor module," with processor 202 being referred to as the "processor core." Furthermore, certain implementations of the present invention may not require nor include all of the above components. For example, the peripheral devices shown coupled to standard I/O bus 208 may couple to high performance I/O bus 206. In addition, in some implementations only a single bus may exist, with the components of network application traffic management unit 200 being coupled to the single bus. Furthermore, network application traffic management unit 200 may include additional components, such as additional processors, storage devices, or memories.

The operations of the network application traffic management unit 200 described herein are implemented as a series of software routines (see FIGS. 4A and 4b) hosted by network application traffic management unit 200. These software routines comprise a plurality or series of instructions to be executed by a processor in a hardware system, such as processor 202. Initially, the series of instructions are stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216c. The instructions are copied from the storage device, such as mass storage 218, into memory 214 and then accessed and executed by processor 202.

An operating system manages and controls the operation of network application traffic management unit 200, including the input and output of data to and from software applications (not shown). The operating system provides an interface between the software applications being executed on the system and the hardware components of the system. According to one embodiment of the present invention, the operating system is a real-time operating system, such as PSOS, or LINUX. In other implementations, the operating system may be the Windows® 95/98/NT/XP/Vista operating system, available from Microsoft Corporation of Redmond, Wash. However, the present invention may be used with other suitable operating systems, such as the Apple Macintosh Operating System, available from Apple Computer Inc. of Cupertino, Calif., UNIX operating systems, and the like.

FIG. 4B provides an illustration of the components and functional modules, and data structures, relevant to how packets are processed by network application traffic management unit 200. As FIG. 4B illustrates, network application traffic management unit 200 includes inside NIC receive ring 81a, outside NIC receive ring 81b, inside NIC receive queue 84a, outside NIC receive queue 84b, NIC driver 83, and packet buffer 82. Packet buffer 82 is operative to store packets received at packet interfaces 216a, 216b. To summarize the operations associated with receiving and ultimately processing packets, network interface 216a, for example, receives and stores a packet in packet buffer 82. Network interface 216a also maintains a pointer to the packet in inside NIC receive ring 81a. As discussed more fully below, NIC driver 83 determines whether to queue or otherwise retain the packet, or to discard it. In one implementation, NIC driver 83, operating at periodic interrupts, writes pointers out of inside NIC receive ring 81a and into inside NIC receive queue. Network application traffic management unit 200 operates substantially identically for packets received at outside packet interface 216b. Network device application 75, in one implementation, operates on packets stored in packet buffer 82 by accessing the memory address spaces (pointers) to the packets in inside NIC receive queue 84a and outside NIC receive queue 84b. In one implementation, a sample packet received at inside packet interface 216a is dropped, after processing by network device application, as opposed to being transmitted from outside packet interface 216b. The rings and other data structures supporting the transmission of packets from network interfaces 216a, 216b are not shown.

In one implementation, packet buffer 82 comprises a series of fixed-size memory spaces for each packet (e.g., 50,000 spaces). In other implementations, packet buffer 82 includes mechanisms allowing for variable sized memory spaces depending on the size of the packet. Inside NIC receive ring 81a is a circular queue or ring of memory addresses (pointers) corresponding to packets stored in packet buffer 82. In one implementation, inside NIC receive ring 81a includes 256 entries; however, the number of entries is a matter of engineering and design choice. In one implementation, each entry of inside NIC receive ring 81a includes a field for a memory address, as well as other fields for status flags and the like. For example, one status flag indicates whether the memory address space is empty or filled with a packet. Inside NIC receive ring 81a also maintains head and tail memory addresses, as described below. In one implementation, packet interface 216a also maintains the head and tail memory address spaces in its registers. The head memory address space corresponds to the next available memory space in packet buffer 82 to which the next packet is to be stored. Accordingly, when packet interface 216a receives a packet, it checks the head address register to determine where in the system memory reserved for packet buffer 82 to store the packet. After the packet is stored, the status flag in the ring entry is changed to "filled". In addition, the system memory returns a memory address for storing the next received packet, which is stored in the next entry in inside NIC receive ring 81a, in addition, the head address register is advanced to this next memory address. The tail memory address space corresponds to the earliest received packet which has not been processed by NIC driver 83. In one implementation, packet interface 216a also maintains a copy of inside NIC receive ring 81a in a memory unit residing on the network interface hardware itself. In one implementation, packet interface 216a discards packets when inside NIC receive ring 81a is full-i.e., when the tail and head memory addresses are the same.

As discussed above, NIC driver 83 is operative to read packet pointers from inside NIC receive ring 81a to inside NIC receive queue 84a. In one implementation, NIC driver 83 operates on inside NIC receive ring 81a by accessing the tail memory address to identify the earliest received packet. To write the packet in the inside NIC receive queue 84a, NIC driver 83 copies the memory address into inside NIC receive queue, sets the status flag in the entry in inside NIC receive ring 81a corresponding to the tail memory address to empty, and advances the tail memory address to the next entry in the ring. NIC driver 83 can discard a packet by simply dropping it from inside NIC receive ring 81a, and not writing it into inside NIC receive queue 84a. As discussed more fully below, this discard operation may be performed in connection with random early drop mechanisms, or the load shedding mechanisms, according to those described in commonly-owned U.S. application Ser. No. 10/843,185, entitled "Packet Load Shedding", filed on May 11, 2004, whose disclosure is incorporated herein by reference for all purposes. Still further, NIC driver 83, in one implementation, is a software module that operates at periodic interrupts to process packets from inside NIC receive ling 81a to inside NIC receive queue 84a. At each interrupt, NIC driver 83 can process all packets in receive ring 81a or, as discussed more fully below, process a limited number of packets. Furthermore, as discussed more fully below, a fairness algorithm controls which of inside NIC receive ring 81a and outside NIC receive ring 81b to process first at each interrupt.

In one implementation, inside NIC receive ring 81a, outside NIC receive ring 81b, inside NIC receive queue 84a, outside NIC receive queue 84b, and packet buffer 82 are maintained in reserved spaces of the system memory of network application traffic management unit 200. As discussed above, network device application 75, operating at a higher level, processes packets in packet buffer 82 popping packet pointers from receive queues 84a, 84b. The system memory implemented in network application traffic management unit 200, in one embodiment, includes one or more DRAM chips and a memory controller providing the interface, and handling the input-output operations, associated with storing data in the DRAM chip(s). In one implementation, the hardware in network application traffic management unit 200 includes functionality allowing first and second network interfaces 216a, 216b to directly access memory 82 to store inbound packets received at the interfaces in packet buffer. For example, in one implementation, the system chip set associated with network application traffic management unit 200 can include a Direct Memory Access (DMA) controller, which is a circuit that allows for transfer of a block of data from the buffer memory of a network interface, for example, directly to memory 82 without CPU involvement. A variety of direct memory access technologies and protocols can be used, such as standard DMA, first-party DMA (bus mastering), and programmed I/O (PIO). In one implementation, each network interface 216a and 216b is allocated a DMA channel to the memory 82 to store packets received at the corresponding interfaces.

FIG. 4A is a block diagram illustrating functionality, according to one embodiment of the present invention, included in network application traffic management unit 200. In one embodiment, network application 75 of network application traffic management unit 200 comprises packet processor 131, data plane interface module 132, measurement engine 140, traffic classification engine 137, management information base (MIB) 138, and administrator interface 150. The co-pending and commonly owned patents and patent applications identified above describe various functions and operations that can be incorporated into network application traffic management unit 200. Packet processor 131 is operative to detect new data flows and construct data structures including attributes characterizing the data flow. Data plane interface module 132 is operative to generate control messages and transmit them to network processing unit 300, as well as receive packets (control messages and sampled packets) from network processing unit 300 and selectively forward sampled packets to packet processor 131. Traffic classification engine 137 is operative to analyze data flow attributes and identify traffic classes corresponding to the data flows. In one embodiment, traffic classification engine 137 stores traffic classes, in association with pointers to bandwidth utilization controls or pointers to data structures defining such bandwidth utilization controls. Management information base 138 is a database of standard and extended network objects related to the operation of network application traffic management unit 200. Measurement engine 140 maintains measurement data relating to operation of network application traffic management unit 200 to allow for monitoring of bandwidth utilization across access link 21 with respect to a plurality of bandwidth utilization and other network statistics on an aggregate and/or per-traffic-class level. Network application traffic management unit 200, in one embodiment, further includes a persistent data store (not shown), such as a hard disk drive, for non-volatile storage of data.

Administrator interface 150 facilitates the configuration of network application traffic management unit 200 to adjust or change operational and configuration parameters associated with the device. For example, administrator interface 150 allows administrators to select identified traffic classes and associate them with bandwidth utilization controls (e.g., a partition, a policy, etc.). Administrator interface 150, in one implementation, also displays various views associated with a traffic classification scheme and allows administrators to configure or revise the traffic classification scheme. Administrator interface 150 can be a command line interface or a graphical user interface accessible, for example, through a conventional browser on client device 42. In addition, since in one implementation, network processing unlit 300 may not be a network addressable device and only responds to control messages transmitted from network application traffic management unit 200, administrator interface 150 provides a unified user interface for network application traffic management unit 200 and network processing unit 300 in the aggregate.

As disclosed in U.S. application Ser. No. 10/843,185, the number of packets in the inside or outside NIC receive queues 84a, 84b can be monitored to signal a possible overload condition. That is when the number of packets in one of the queues exceeds a threshold parameter, network application traffic management unit 200 may perform one or more actions. In one implementation, network application traffic management unit 200 may transmit a message to network processing unit 300 signaling that it is at or near an overload state. As described in more detail below, network processing unit 300 responsive to such a message may stop sampling packets to network application traffic management unit 200 or reduce the rate at which packets are sampled. Still further, as described in U.S. application Ser. No. 10/843,185, network application traffic management unit 200 may access host database 134 to compare certain observed parameters corresponding to the source hosts identified in received packets, and compare them against corresponding threshold values to determine whether to discard received packets. For example, a host identified as being part of a Denial-of-Service attack may be deemed a "bad host." In one implementation, network application traffic management unit 200 may transmit control messages to network processing unit 300 directing it to drop packets from an identified bad host.

When network application traffic management unit 200 operates without network processing unit 300 it generally operates to receive packets at a first interface (e.g., packet interface 216a), process the packets, and emit the packets at a second interface (e.g., packet interface 216a), or vice versa. When configured to operate in connection with network processing unit 300, however, network application traffic management unit 200 is configured to receive and process the packets sampled to it, but to drop the packets instead of emitting them. As part of this process, network application traffic management unit 200, in one implementation, receives a sampled packet, processes the packet, and may transmit one or more control messages to network processing unit 300 indicating how subsequent packets of a data flow should be handled.

A.1.b. Network Processing Unit

FIG. 3 also illustrates an example system architecture for a network processing unit 300 according to a particular implementation of the invention. In one implementation, network processing unit 300 comprises a multi-core processor such as the Octeon Plus CN58XX 4 to 16-Core MIPS64-Based SoCs offered by Cavium Networks of Mountain View, Calif. Of course, any other suitable multi-core processor can be used. In the implementation shown in FIG. 3, network processing unit 300 comprises processor 302 (comprising one to a plurality of processing cores), cache 304 (e.g., L2 cache shared among the processing cores), memory controller 306 and random access memory (RAM) 308. Network processing unit 300, in one implementation, further comprises packet input module 310, I/O bridge 312, packet output module 314, TCP unit 316, scheduler or work order module 318, and packet interfaces 320a-d. Network processing unit 300 may also include other functional modules such as a regular expression unit for string matching, a compression/decompression unit for accelerating network traffic, and an encryption unit. Still further, network processing unit 300, in some implementations, may include multiple multi-core processors.

Although not illustrated, in one implementation, network processing unit 300 may also include a power supply, RJ-45 or other physical connectors, and a chassis separate from network application traffic management unit 200. For example, as discussed above, network processing unit 300 may be a separate physical unit in the form factor of a 1 U or 2 U appliance. The network processing unit 300 may be used to accelerate and enhance the throughput of an existing network application traffic management device, such as network application traffic management unit 200. In one implementation, without network processing unit 300, application traffic management unit 200 would be directly connected to the network path segment between network 50 and network 40a. For example, packet interface 216a would be operably connected to network 50, while packet interface 216b would be operably connected to network 40a. To increase throughput, however, network processing unit 300 may be interconnected as shown in FIGS. 2 and 3.

Network processing unit 300 can be configured to perform various data plane operations, and to selectively forward packets to application traffic management unit 200. In one possible configuration, application traffic management unit 200 performs higher-level processing of packets of respective data flows to classify the data flows and identify one or more policies to be applied to the data flows. Throughput can be increased, due to the capabilities of the network processing unit 300 to perform data plane operations on packets at wireline or near wireline speeds, and that network application traffic management unit 200 sees only a subset of all packets traversing networks 40a and 50. Accordingly, in one implementation, implementations of the invention provide for an inexpensive and easily deployable solution that accelerates the performance of existing hardware and allows an end-user to preserve investments in existing hardware platforms. In one such implementation, the network processing unit 300 can be distributed with a computer-readable media, such as optically or magnetically recorded disks or tapes, that include one or more software modules that, when installed, modify the operation of the network application traffic management unit 200 to interact with the network processing unit 300 as described herein. The computer-readable media may also include a copy of firmware for the network processing unit 300. In one implementation, network application traffic management unit 200 can store the firmware and provide it to network processing unit 300 during a configuration session. In other implementations, however, the network processing unit 300 and network application traffic management unit 200 may be incorporated into the same chassis.

B. Control Messages

As described herein, network application traffic management unit 200 (Control Plane) and network processing unit 300 (Data Plane) implement a two-way message path by which network application traffic management unit 200 directs network processing unit 300 which policies should be applied to the data flows traversing it. In a particular implementation, network processing unit 300 also returns network statistics, such as Measurement Samples, to be integrated into the measurement and reporting functionality of measurement engine 140 of network application traffic management unit 200. The Control Plane makes the flow decision after completing classification of the flow, including peeking at the data packets as necessary and consulting the policies stored in the traffic classification engine 137. Example network traffic classification mechanisms are described in U.S. application Ser. Nos. 11/019,501, as well as other patents and patent applications identified above. Still further, as discussed in more detail below, the Control Plane may direct the Data Plane to cache the traffic classification and policy decisions made in connection with a given data flow, and apply the same policies to subsequent data flows that include a set of matching attributes, such as destination network address, port and protocol identifiers.

Control messages between the network application traffic management unit 200 and network processing unit 300, in one implementation, use a specific VLAN to facilitate identification of control messages and other communications between them. In some implementations, VLAN tagging is not employed. Flow Information Messages have the same IP and TCP/UDP protocol headers as the flow they refer to in order to get the same tuple hash from the network processor hardware. Alternatively, flow information messages can be encapsulated in IP-in-IP or Generic Routing Encapsulation (GRE) or other tunneling protocols. Other control messages use specific addresses for the network application traffic management unit 200 and network processing unit 300. These are local to the two units (in one implementation, chosen from the 127 class A address range) and need no configuration.

In a particular implementation, there are 5 types of control messages from the Control Plane to the Data Plane, and 3 types of control messages in the reverse direction. The first message sent to the Control Plane is the SizingData message describing one or more attributes of various operational data structures, such as the sizes of tables. PartitionInfo messages are sent to describe the configuration of partitions, and any subsequent changes. A FlowInfo message is sent when network application traffic management unit 200 decides on the partition and policy to apply to a flow. Two message types, the OverloadStatus and the BadHostInfo inform the Data Plane when the network application traffic management unit 200 enters or leaves an overloaded condition and of any hosts the Load Shedding feature decides are behaving badly.

The three types of messages sent from the Data Plane to the Control Plane are the ReTransmitRequest to recover from possible lost messages or to resynchronize, the MeasurementSample message to transmit measurement samples for the configured traffic classes and partitions, and the LittleNote to transmit status messages to be logged.

Other message types may also be implemented for different functions. For example, one or more message types may be configured for compression functions, such as a message for setting up Layer 3 tunnels with remote nodes, and specifying the compression algorithm to be used. Other message types may include encryption message types as well. In yet other embodiments, network application traffic management unit 200 may store a firmware image for network processing unit 300 and interact (typically during initialization) to determine the firmware image stored on network processing unit 300. Network application traffic management unit 200, if it determines that a firmware update is required, may transmit the firmware image to network processing unit 300 in one to a plurality of control messages.

B.1. SizingData Message

Network application traffic management unit 200 transmits a SizingData message to provide an initial configuration to the network processing unit 300. In a particular implementation, network processing unit 300 simply forwards received packets along the network path to their destination without processing, until it receives a configuration from the network application traffic management unit 200. The SizingData message indicates the capacities of the Control Plane. In a particular implementation, the Data Plane allocates its memory to be aligned with these capacities, such as the number of partitions, the number of supported traffic classes, the number of supported flow blocks. The following illustrates an example format of a SizingData message according to one particular implementation of the invention. In a particular implementation, objects, such as data flows, partitions, and classes are referenced relative to an index and an instance identifier.

moved, or resized. A PartitionInfo message can also be transmitted in response to a ReTransmitRequest message sent by the Data Plane (see below).

```
         typedef struct __PartitionInfo {
                 uint16_t           type;
#define          kPartitionInfoType                789
                 uint16_t           seq;
                 ObjectReference    partition;     // this partition
                 uint8_t            direction;
#define          kInboundDirection                 0
#define          kOutboundDirection                1
                 uint8_t            isroot;
                 uint8_t            action;
#define          kPartitionActionNew               1
#define          kPartitionActionResize            2  // linkages
                                                         unchanged
#define          kPartitionActionDetach            3  // detach, don't
                                                         delete, uses
                                                         old parent
#define          kPartitionActionReattach          4  // is detached,
                                                         parent is new
                                                         parent
#define          kPartitionActionDelete            5  // should be
                                                         leaf, parent
                                                         is old parent
#define          kPartitionActionRetransmit        6
                 uint8_t            isdefault;
                 ObjectReference    parent;
                 uint32_t           minbw;
                 uint32_t           maxbw;
         } PartitionInfo, *PartitionInfoPtr;
```

Some partition attributes in the PartitionInfo message include the minimum (minbw) and maximum (maxbw) bandwidth allocated to the partition, the identity of the parent of the partition, the direction of traffic flow (direction) to which the partition corresponds, and whether the partition is the default partition (isdefault) or root (isroot) for that direction.

B.3. FlowInfo Message

A major aspect of the control functions performed by the Control Plane is embodied in the FlowInfo message sent by the Control Plane when it has decided what policy or policies

```
         typedef struct __ObjectReference {
                 uint16_t           index;
                 uint16_t           instance;
         } ObjectReference;
         typedef struct __SizingData {
                 uint16_t           type;
#define          kSizingDataType                   787
                 uint16_t           seq;              // sequence number
                 uint32_t           ipaddr;           // main address of NATM
                 uint32_t           ptncount;         // # of partitions
                 uint32_t           classcount;       // # of traffic classes
                 uint32_t           flowcount;        // # of flow blocks
                 uint16_t           servicecount;     // # of services
                 uint16_t           triggerexpiration; // in minutes
                 uint32_t           triggerlines;     //number of DTP hash groups
         } SizingData, *SizingDataPtr;
```

The trigger expiration parameter indicates the length of time that a cached policy decision is valid. In one implementation, a null or zero value indicates that the cached policy decision does not time out. The trigger lines parameter indicates the number of hash groups the Data Plane should allocate in memory.

B.2. PartitionInfo Message

Network application traffic management unit 200 sends PartitionInfo messages when a partition is created, deleted, should be applied to a new data flow. In one implementation, the Control Plane is operative to create a data structure for the flow, and transmit a FlowInfo message to the Data Plane. The FlowInfo message causes the Data Plane to create a flow block, which is a data structure or object for storing various attributes of the data flow. The flow block is identified by a FlowIndex and an instance value. Attributes of the flow block may include one or more of the attributes defined in the FlowInfo message set forth below. The following illustrates attributes that may be included in a FlowInfo message according to one particular implementation of the invention.

```
            typedef struct __FlowInfo {
                    uint16_t            type;
#define             kFlowInfoType               788
                    uint16_t            seq:
                    uint32_t            flowindex;          // identifies flows
                    uint16_t            flowinstance;
                    uint16_t            service;            //service identifier for flow
                    uint8_t             serverside;
#define                 kInSide         0                   //server located inside
#define                 kOutSide        1                   //server located outside
                    uint8_t             sendmore;           // keep sending packets
                    uint8_t             policies[2];
#define                 kPolicyPriority             0x01
#define                 kPolicyRate                 0x86    // any of these bits
#define                 kPolicyPassThru             0x08
#define                 kPolicyDiscard              0x10
#define                 kPolicyNever                0x20
                    ObjectReference     classes[2];         //by direction
                    ObjectReference     partitions[2];
                    uint8_t             priorities[2];
                    unit8_t             trigger;
#define                 kTriggerDont            0
#define                 kTriggerRemember        1
#define                 kTriggerRecycled        2
#define                 kTriggerServiceOnly     3
                    uint8_t             direction;          // to hash flow
                                                            attribute tuple
            } FlowInfo, *FlowInfoPtr;
```

Each data flow is identified by its FlowIndex, a number uniquely determined by which flow block (TCB or UCB type) was allocated to it by the Control Plane. The FlowInfo message, in a particular implementation, contains the determined policy (for example, one of Priority, Rate, PassThru, Discard, or Never). Still further, the FlowInfo messages may also include a service parameter which is a value that maps to a network application type (such as Oracle® database, FTP, Citrix®. HTTP, and other network applications). The serverside parameter indicates whether the location of the server of the data flow relative to the Data and Control plane. A server is typically the host that received the initial packet of the data flow (such as a TCP SYN) from a client host. The inside or outside server determination is based on detection of the initial packets of a data flow and their direction. With reference to FIG. 1, an "inside" server relative to network application traffic management device 30 associated with network 40a, is a host connected to network 40a, while an outside server host is a host located across network 50. In one particular implementation, there are policies for each direction ("inbound" and "outbound") or "half-flow" of the traffic flow. There are also two traffic class indices, partition numbers, and priorities in the FlowInfo message. The partition parameter indicates the partition to which the data flow should be associated for each traffic direction, while the priority parameter indicates the priority of the data flow.

The FlowInfo message may also contains control variables related to interaction between the Control Plane and Data Plane relative to the data flow. For example, the Control Plane may set the sendmore variable to false to indicate that the Data Plane should completely take over handling packets of the data flow. For example, as described in more detail below, the Data Plane will continue to sample packets of a data flow to the Control Plane until it receives a FlowInfo message for that data flow, where the sendmore variable is set to "false." If the sendmore variable is set to true, the Data Plane will continue to sample packets to the Control Plane until the Control Plane transmits another FlowInfo message with sendmore set to false. In a particular implementation, when packet sampling stops for a given data flow is defined by the Control Plane, which can use this mechanism to implement one or more value added features, such as packet capture. For example, if a data flow hits a traffic class with packet capture enabled, the Control Plane can set sendmore to true and never clear it for the life of the data flow. Anything that required the Control Plane to handle all the packets of a flow could be handled in this manner.

FlowInfo messages may also contain a trigger parameter indicating whether the Control Plane should cache the service identification (service), traffic classification (classes) and policy (partitions, priorities) decisions contained in the FlowInfo message. For example, if the trigger parameter is 0, the Data Plane does not cache this information. If the trigger parameter is 1, the Data Plane caches this information for use in connection with subsequent data flows that match the server-side attributes of the current data flow. Furthermore, the Control Plane may set the trigger parameter to 2, indicating that the Control Plane acknowledges the matching of the data flow to cached information and should not be cached another time. The Control Plane may also set the trigger parameter to 3 to indicate that the flow information (such as network application type) should be cached in the triggering cache, but that default policies (instead of cached policies in the triggering) should be applied. Processing of FlowInfo messages is described in more detail below.

In a particular implementation, FlowInfo messages have the same IP and TCP/UDP protocol headers as the data flow to which they refer. In such a configuration, the network processing unit 300 computes the same hash value for the 5-tuple (see below) of header attributes that are used to identify data flows. Network processing unit 300 has functionalities that allow for the packets of the same data flow to be processed by a common processor core. Addressing the FlowInfo messages in this manner allows the control messages for a flow to be processed by the same processor core handling data packets of the flow. Alternatively, the attributes of the 5-tuple for the data flow can also be included in the FlowInfo message, and the addresses in the headers can correspond to the addresses of the Data Plane and Control Plane.

B.4. OverloadStatus and BadHostInfo Messages

The Control Plane uses the OverloadStatus and BadHostInfo messages to control the flow of sampled packets from the Data Plane. The following defines the formats of the OverloadStatus and BadHostInfo messages according to an implementation of the invention.

```
        typedef struct __OverloadStatus {
                uint16_t            type;
#define                 kOverloadStatusType     791
                uint16_t            seq;
                uint8_t             overloaded;
        } OverloadStatus, *OverloadStatusPtr;
        typedef struct __BadHostInfo {
                uint16_t            type;
#define                 kBadHostType            792
                uint16_t            seq;
                uint32_t            ipaddr;
                uint32_t            client;
                uint8_t             direction;
        } BadHostinfo, *BadHostInfoPtr;
```

In one implementation, the Data Plane is not configured with a "maximum rate" the Control Plane is capable of handling. Rather, the Control Plane learns this from the OverloadStatus messages sent from the Control Plane when it senses an overload condition, such as a threshold number of packets in one or more receive queues. This signaling scheme allows the Data Plane to automatically adjust to interfacing with other models of a network application traffic management unit 200 or recognizing that different network traffic mixes may place different loads on the classification mechanisms of the Control Plane.

In a particular implementation, the Control Plane also indicates to the Data Plane when hosts are behaving badly. For example, the Control Plane may send a BadHostInfo message to inform the Data Plane of any hosts the Load Shedding feature decides are behaving badly. The Data Plane can reduce or block traffic for a period of time in response to the BadHostInfo messages. In one implementation, the Data Plane can grow the packet rate sampled to the Control Plane (relative to a given host) until it receives a subsequent BadHostInfo message from the Control Plane.

B.5. ReTransmitRequest Message

As discussed above, the Data Plane may also transmit messages to the Control Plane. For example, the Data Plane may send a ReTransmitRequest message that lets the Data Plane ask for a replay of certain of the downward control messages. In a particular implementation, the Data Plane may transmit a ReTransmitRequest message each time it sees an object referenced in a control message for which it has no information. For example, the Data Plane may request a replay of the SizingData message, which may get lost while the Control Plane is booting up, or the OverloadStatus message, which might get lost in an overload condition, and the PartitionInfo message, which is helpful for resynchronization when the Control Plane comes up after the Data Plane. ReTransmitRequest messages also facilitate resynchronization between the Control Plane and the Data Plane in the event of a fault or crash of either the Data Plane or the Control Plane. The following illustrates the format of a ReTransmitRequest message according to one particular implementation of the invention.

```
        typedef struct __ReTransmitRequest {
                uint16_t            type;
#define                 kRetransmitType         775
                uint16_t            seq;
                uint16_t            what;        // message
                                                 type to resend
                uint16_t            index;       // partition
                                                 index
                                                 (kPartition-
                                                 InfoType)
        } RetransmitRequest, *RetransmitRequestPtr;
```

B.6. MeasurementSample Message

In one implementation, the Control and Data Planes implement a measurement data signaling scheme to allow measurement engine 140 to maintain network statistics relative to data flows, partitions and traffic classes. In a particular implementation, the Data Plane transmits MeasurementSample messages to the Control Plane such that it can update the values of various statistics it maintains. The following illustrates the format of a MeasurementSample message according to one possible implementation of the invention.

```
        typedef struct __MeasurementSample {
                ObjectReference     obj;
                uint32_t            packets;
                uint32_t            bytes;
        } MeasurementSample, *MeasurementSamplePtr;
        typedef struct __MeasurementData {
                uint16_t            type;
#define                 kMeasurementDataType    777
                uint16_t            seq;
                uint16_t            count;
                uint8_t             flavor;
#define                 kMeasurementFlavorPartition  1
#define                 kMeasurementFlavorClass      2
#define                 kMeasurementFlavorService    3
                uint8_t             pad;
                MeasurementSample   samples[1];  //count
                                                 samples
                                                 here
        } MeasurementData, *MeasurementDataPtr;
```

In one implementation, the Data Plane maintains byte and packet counts per traffic class and per partition (excluding the "sampled" packets which the Control Plane has already counted). On a periodic basis, a background task will bundle up samples for active classes and partitions, and forward the data back to the Control Plane for recording in MeasurementSample messages.

B.7. LittleNote Message

For diagnostic purposes, the Control Plane may send log data (such as "printf" output) LittleNote messages. At the Control Plane, the events may be logged into the Control Plane "system event" log as well as copied to any configured syslog servers. The following illustrates the format of a LittleNote message according to one possible implementation of the invention.

```
            typedef struct __LittleNote {
                    uint16_t            type;
#define                                 kLittleNoteType     779
                    uint16_t            seq;
                    uint8_t             level;              // SYSLOG_LEVEL
#define                                 kNoteEmerg          0
#define                                 kNoteAlert          1
#define                                 kNoteCrit           2
#define                                 kNoteErr            3
#define                                 kNoteWarning        4
#define                                 kNoteNotice         5
#define                                 kNoteInfo           6
#define                                 kNoteDebug          7
                    uint8_t             pad;
                    uint16_t            reserved;
                    char                note[1];            // null terminated
            } LittleNote, *LittleNotePtr;
```

C. Example Process Flows

FIG. 5A illustrates an example process flow, according to one possible implementation of the invention, executed by the network processing unit 300. When network processing unit 300 receives a packet (502), the hardware of the network processing unit 300 includes a packet parsing logic circuit that parses a received packet and computes a hash of an attribute tuple of the received packet. In one implementation, the tuple comprises the source IP address, destination IP address, source port number, destination port number, and a protocol identifier (such as TCP, UDP, etc.). Network processing unit 300 uses this 5-tuple to identify different data flows between hosts. In one implementation, the values of these fields are arranged in an order, depending on the direction the packet is traveling, to ensure that the resulting hash is the same for data flows of the packet transmitted in either direction. In one implementation, the hardware-computed hash is a 16-bit hash. A secondary longer (e.g., 32-bit) hash, or a hash using a different algorithm, of the same 5-tuple is also computed to identify the data flow. In one implementation, the 16-bit hash computed by hardware may map to one or more secondary hashes. To identify a data flow, the 16-bit hash essentially narrows the search space to a subset of the secondary hashes that are mapped to the 16-bit hash.

As FIG. 5A illustrates, if the received packet is not an IP packet (504), network processing unit 300 forwards the packet along toward its destination from an egress interface that corresponds to the packet interface on which the packet was received (506). In other implementations, network processing unit 300 and the control plane can be configured to process non-IP packets as well. Furthermore, if the received packet is a control message (see above) from the Control Plane (508), network processing unit 300 passes the control message to a process that programs the data plane by changing one or more attributes of the data plane configuration (510). For example, network processing unit 300 may create a flow block in response to a FlowInfo message. The FlowInfo message may identify a partition and a priority for the data flow. In one implementation, flow blocks are identified by the FlowIndex values of FlowInfo messages. See also FIG. 5C, discussed below. Otherwise, network processing unit 300 determines whether it has a flow reference that matches the hash it previously computed for the packet (512). If not, network processing unit 300 creates a flow reference in response to the data packet (514). A flow reference includes a key (typically a hash of the 5-tuple attribute values, see above), a FlowIndex value (indexing into an array or table (or other data structure) of flow blocks, and a flow instance identifier. When initially created, the flow reference includes a null FlowIndex value, which may subsequently be modified to index to a flow block when created. As discussed in connection with FIG. 5B, however, the FlowIndex value may be set to an entry of cached flow information in a triggering cache.

As FIG. 5A illustrates, network processing unit 300 may be configured to sample packets to network application traffic management unit 200 (518), if there is no flow block created for the data flow (516). If there is no flow block for the data flow, network processing unit 300 may apply one or more default policies to the packet (520). For example, network processing unit 300 may assign the packet to a default partition having a maximum bandwidth parameter enforced by scheduler 318. If a flow block exists (516), network processing unit 300 determines whether to sample the packet to network application traffic management unit 200 (522, 524). For example, the sendmore attribute of the flow block may be set to true. In addition, the received packet may be a data flow or connection-terminating packet (such as a TCP FIN or RST). In a particular implementation, network processing unit 300 is configured to transmit connection-initiating (e.g., handshake or TCP SYNs and SYN/ACKs), and connection-terminating packets (e.g., TCP FINs, RSTs, etc.) to allow network application traffic management unit 200 to set up and tear down data structures as required. Lastly, as FIG. 5A illustrates, network processing unit 300 then stores the packet in a flow queue corresponding to the flow reference (526). In one implementation, if there are no packets currently stored in the flow queue, the process generates a message to the partition identified in the flow object (or the default partition), which causes the network processing unit hardware to generate a work entry identifying the partition. As discussed in more detail below, a policy enforcement mechanism schedules packets from the flow queues for output using a hierarchical partition configuration.

In one implementation, the internal processes of network application traffic management unit 200 assume that a data flow has terminated if a packet associated with the data flow has not been encountered in a threshold period of time. Termination of a data flow may cause the network application traffic management unit 200 to tear down various data structures for the data flow (to allow the memory space to be used for other data flows). In such implementations, the network processing unit 300 may be configured to periodically sample packets to network application traffic management unit 200 (even after sendmore has been set to false) to ensure that the network application traffic management unit 200 does not deem the flow terminated. The rate at which these packets are sampled will depend on the configuration of the network application traffic management unit 200 and the threshold values it uses to deem flow terminated. In such an implementation, the decisional logic represented in 522 of FIG. 5A can be augmented to include a check that companies the last sample time to the current time and to conditionally sample the packet if the time difference is greater than a threshold.

C.1. Server-Side Triggered Policies

Figure 5C:
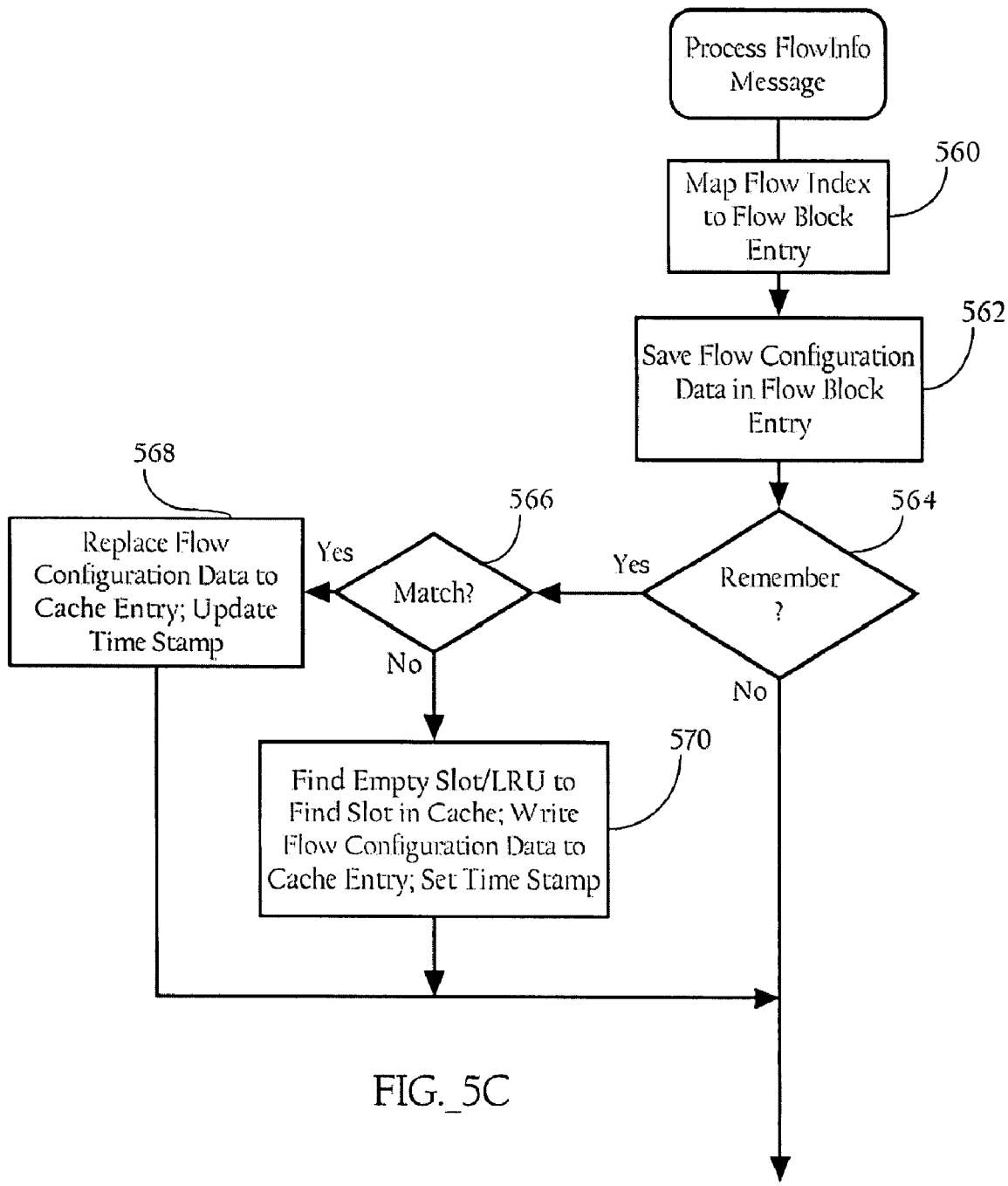
FIG. 5C is a flow chart providing an example method directed to processing control messages at a network processing unit.

According to the process flow illustrated in FIG. 5A, the Data Plane applies one or more default policies to new data flows until it receives a FlowInfo message from the Control Plane identifying one or more policies to be applied. FIGS. 5B and 5C illustrate an alternative implementation where the Data Plane may possibly apply cached policies, as opposed to default policies, to new data flows that match one or more criterion, such as server-side related attributes of IP address and port number.

As discussed above, the Data Plane may maintain a set of flow objects in a reserved memory space. The flow objects include flow attribute information and one or more applicable policies (see above). The Data Plane may also reserve memory (a triggering cache) for the caching of flow attribute information for possible re-use for subsequent data flows. As discussed above, the Data Plane may store in a triggering cache certain flow information responsive to the value of the trigger parameter in FlowInfo messages. FIG. 5C illustrates an example process that a Data Plane may apply to a received FlowInfo message. As FIG. 5C shows, when the Data Plane receives a FlowInfo message, it maps the FlowIndex value in the FlowInfo message to a flow object entry in the reserved memory space (560), and saves the flow configuration data in the Flow Block entry (562). If the trigger parameter is set to "remember" (564), the Data Plane then accesses the triggering cache to identify whether a matching entry exists (566). A cache entry may comprise a key value, a time stamp, and flow attribute and configuration information (such as service identifiers, policies and the like). The key comprises a tuple of an IP address, port number and a protocol identifier. In one implementation, the IP address and port number used for the key is determined with reference to the serverside parameter in the FlowInfo message. That is, the Data Plane uses the serverside parameter to identify the IP address and port number of the server of the data flow and uses this information and the protocol identifier to generate the key.

In one implementation, the cache is organized as a set of hash groups, where each hash group includes a set of N cache entries. In addition, each cache entry is also addressed relative to an index value that maps to the memory space reserved for the cache. To identify a possible matching entry, the Data Plane may compute a hash of the key to select a hash group, and then search (possibly computing a secondary hash) the entries for a key that matches. If a matching entry in the cache exists, the Data Plane updates or replaces the flow configuration information in the cache entry and updates the time stamp (568). If no matching entry exists, the Data Plane selects a cache entry within the hash group to store the flow configuration data (570), setting a time stamp as well. If there is no empty slot in the hash group, the Data Plane may use a least-recently used (LRU) algorithm to select an entry based on the value of the time stamps.

The cached flow information may be used for subsequent data flows, where the server-side attributes of the flow match the cached information. In other words, use of the cached flow information may be triggered by the destination (server-side) IP address, destination (server-side) port number and protocol identifier of the initial packet of the data flow. How the Control Plane sets the trigger value of the FlowInfo message may also be specified by one or more policies. The configuration of server-side triggered caching policies can be based on a variety of factors, and can be fully automated, partially automated based on a rule set, and/or manually performed by a network administrator. For example, a network administrator may have configured a traffic classification based on a network application where the server port is static. The Control Plane may set the triggering policy to "remember" (1) by default. In addition, a network administrator may have configured a traffic class with a matching rule based on a host list. In one implementation, the Control Plane might, as a default operation, want the Data Plane to cache the partition and policies for a server found the user-created host list. The traffic classification database of the Control Plane may be configured to associate server-side trigger polices to various network application types. Application of the server-side triggered caching policies can be based on a variety of factors associated with the behavior of the network application or service type and/or other factors, such as the configuration of the network application traffic management device 30. For example, the Control Plane may implement a default rule where server-side triggered policies are implemented for all traffic classifications, except where the traffic classifications are based on network applications that have certain specified behaviors. For example, network applications where data flows use dynamic port number assignments, as FTP data flows, may not be suitable candidates for caching server-side triggered policy information. However, information relevant to FTP control flows can be cached since the server-side port for the control flow is generally static. In addition, a traffic classification database may store a traffic class based on known network applications, such as YouTube, MySpace, among others. Recognizing that the IP address and port number of the sites hosting such network applications is not likely to be dynamic, a server-side trigger policy may be used for the traffic class that causes the trigger value to be set to "remember" when data flows hit that traffic class. Accordingly, packets of subsequent data flows sourced from a client host initiating a connection to a video sharing site at the IP address and port number will hit the cache, causing the cached policies to be applied to the data flows. In addition, server-side triggered caching policies can also be based on whether the network administrator has specified a default policy for a given traffic class, and an exception list (based on client IP address or other attribute). Use of an exception list may indicate that flow information caching may not be suitable. Still further, traffic classification can also be based on attributes that are orthogonal to server-side attributes, such as diffserv or DSCP markings. The Control Plane may be configured to set the trigger policy to "don't" (0) or "service-only" (3) for such traffic classes.

FIG. 5B illustrates a process flow that may be implemented by the Data Plane in connection with server-side triggered policies. The illustrated process is quite similar to that described in connection with FIG. 5A. However, in FIG. 5B, after the Data Plane creates a flow reference, it accesses the triggering cache to determine if a matching cache entry exists (550). To find a match, the Data Plane generates a key comprising the server-side IP address, server-side port number and the protocol identifier contained in the received packet. As discussed above, the Data Plane may hash this key value to identify a hash group, and then search the entries of the hash group to find a matching cache entry. Additionally, a cache hit may also be conditioned on the value of the time stamp in the cache entry relative to a time out value (trigger expiration) transmitted by the Control Plane in a SizingData control message (see above). If no matching entry is found, the Data Plane operates as discussed above relative to the data flow. If a matching entry is found, however, the Data Plane sets the Flow Index value in the flow reference to the index value (K) of the matching cache entry, and sets a flag associated with the packet that causes the data plane to insert a header when sampling the packet to the control plane (see FIG. 8, and accompanying description) (552). Accordingly, when the process proceeds to step 516, the flow reference identifies a flow index value, causing the cached policies (partitions and priorities) in the cache entry to be applied (526), as opposed to the default policy (520). However, if the trigger parameter has been set to 3 (ServiceOnly), as discussed above, then the Data Plane applies the default policy. This configuration allows the Data Plane to apply desired or more appropriate policies to the data flow from the first packet, as opposed to later in the data flow. The Data Plane will also continue to sample the packets until a FlowInfo message for the flow is received. Other implementations are possible. For example, after setting the packet flag and flow index value (552), the process flow may proceed directly to sampling the packet (524).

C.2. Packet Sampling

Figure 7:
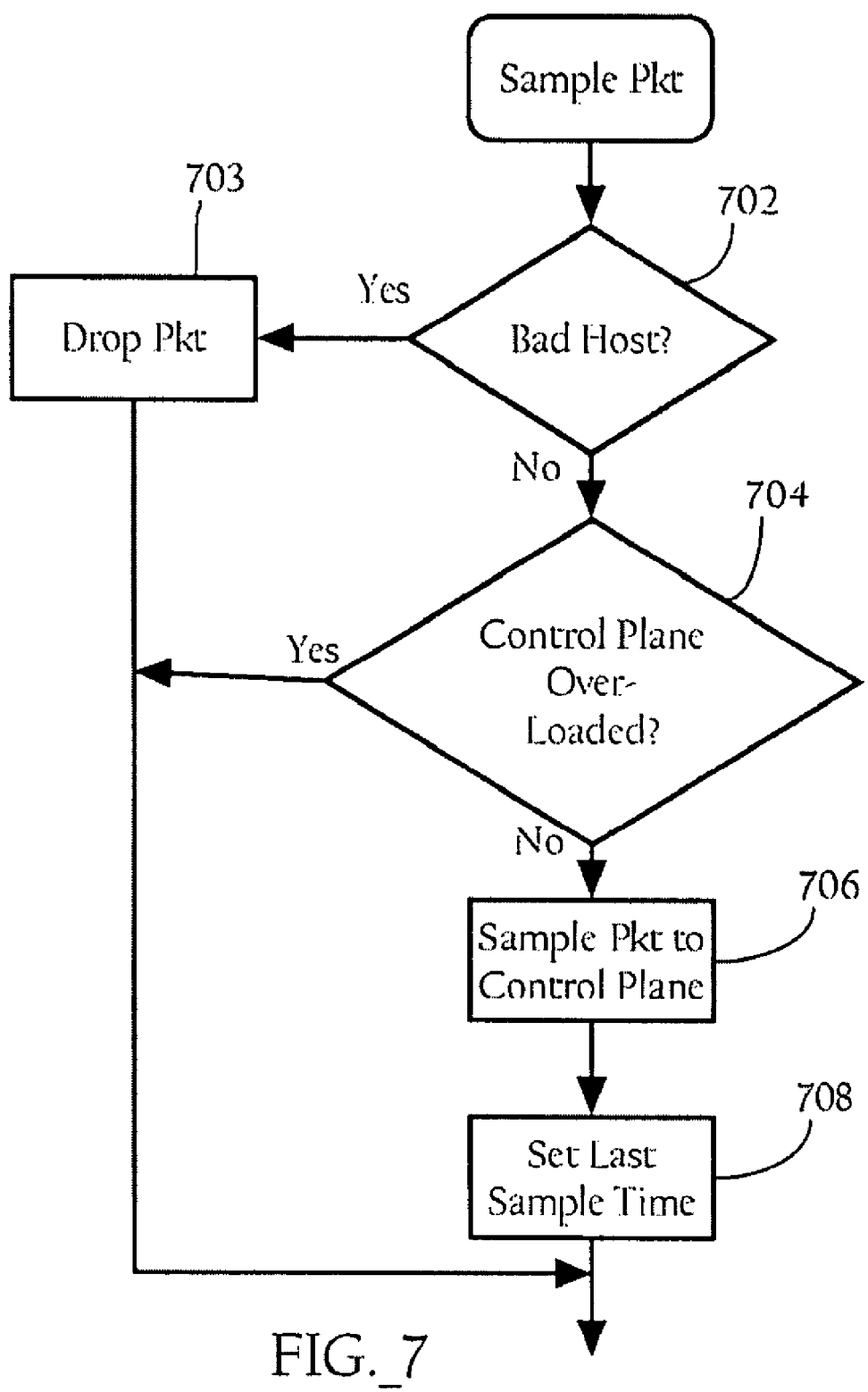
FIG. 7 is a flow chart illustrating a method directed to sampling packets.

FIGS. 6, 7 and 8 set forth process flows, according to one particular implementation of the invention, directed to sampling packets to network application traffic management unit 200. FIG. 6 is a state diagram showing when, and the aggregate rate at which, packets across all data flows are sampled to network application traffic management unit 200. FIG. 7 illustrates a process implemented by the control plane when sampling packets to network application traffic management unit 200.

As FIG. 6 provides, network processing unit 300 is configured to sample packets to network application traffic management unit 200 at a packet sampling rate (602). If the number of packets to be sampled would exceed the current packet sampling rate, network processing unit 300 samples a subset of the packets. For example, if network processing unit 300 receives during a given interval 100 packets to be sampled per second, and the current sampling rate is 50 packets per second, network processing unit 300 would not sample 50 of the packets in a one-second interval. Selection of which packets to sample or not can be based on one or more sampling policies, the details of which are beyond the scope of this disclosure. As FIG. 6 illustrates, as long as the network processing unit 300 does not receive an OverloadStatus message indicating that network application traffic management unit 200 is overloaded (604), it continues sampling packets at the packet sampling rate, periodically growing the packet sampling rate (606, 608). However, if network processing unit 300 receives an OverloadStatus message indicating that network application traffic management unit 200 is overloaded (604), it stops sampling packets to network application traffic management unit 200 and decreases the packet sampling rate (in one implementation, by half of the current sampling rate) (610). As FIG. 6 shows, network processing unit 300 discontinues packet sampling until it receives an OverloadStatis message indicating that network application traffic management unit 200 is ready to receive packets (612). In the implementation shown, network processing unit 300 may also transmit a ReTransmitRequest (6 16) asking for an OverloadStatus message at periodic intervals (614).

As illustrated in FIG. 7, network processing unit 300 may be configured to conditionally sample packets to network application traffic management unit 200. For example, if a host identified in the packet is identified as a bad host in a BadHostInfo message (702), network processing unit 300 may drop the packet entirely (703), or pass the packet to a process that decides whether to drop the packet or pass the packet through. Furthermore, if network application traffic management unit 200 is currently overloaded (704), network processing unit 300 does not sample the packet. Otherwise, network processing unit 300 samples the packet to network application traffic management unit 200 (706), and resets a last sample time value of the flow block. The last sample time value can be used to control sample of packets, such as the leaking of packets to network application traffic management unit 200, see above. As discussed above, in one implementation, network processing unit 300 samples the packet by transmitting it to network application traffic management unit 200. Network processing unit 300 then resumes processing of the packet, such as applying one or more policies.

FIG. 8 illustrates an example process directed to sampling packets to the Control Plane, where the Data Plane constructs and inserts service identifying headers into the first packet of a flow. Referring to FIGS. 7 and 8, when the Data Plane samples a packet to the control plane (706), it determines whether the packet of the data flow matches a cache entry (802), and whether the packet flag has been set (803). If so, the Data Plane constructs a header including a service identifier contained in the matching cache entry, and inserts the header into the sampled packet (804). In a particular implementation, the header is a 4-byte header comprising a 16-bit operation code identifying a service hint type, and a 16-bit value of the service identifier. In one implementation, the header is inserted after the MAC layer header, where VLAN tags are normally inserted. The Data Plane then sends the sampled packet to the Control Plane (806), resetting a last sample packet time. When the network interface returns an indication that the sampled packet has been sent (808), the Data Plane, rather than deleting the packet from the buffer, passes the packet to a policy enforcement mechanism (812), removing the header if one has been added (809, 810).

FIG. 9 shows a process that a Control Plane may apply to sampled packets. As FIG. 9 illustrates, when the Control Plane receives a sampled packet (852), it scans for a header including the service hint operation code (854). If a header exists, the Control Plane extracts the service identifier from the header and adds it to a data structure, such as a flow object, for the data flow (856), and passes the sampled packet to the classification mechanism (858). The existence of a service identifier in the flow object indicates to the classification mechanism that service type identification for the data flow has been accomplished. This saves computing resources for other tasks, since the Control Plane need not process the data flow to identify a service type and can proceed to classifying the data flow.

In the implementation described above, a large portion of the network processing is offloaded to the network processing unit 300, which with its dedicated hardware-level processing features allows for faster processing of network traffic. In the implementation described above, the network processing unit 300 handles network traffic using pre-existing programming. If it does not have a record of a flow and its class, policy, or partition (or matching cached information), it applies defaults to the traffic, and samples the traffic to the network application traffic management unit 200. In this manner, the performance requirements on the network traffic management unit 200 are significantly reduced since it sees only a limited subset of the traffic (typically, the initial packets, one or more leaked packets to prevent flow termination processes of the Control Plane, and possibly terminating packets of a data flow). The network application traffic management unit 200 can classify the traffic filly and report back the class, partition, and policy of the data flow when it is done. In the meantime, the network processing unit 300 continues to use defaults or server-side triggered cached policies until it receives programming for the specific flow. Once programming is received, it handles the traffic using the policies specified by the network application traffic management unit 200. Further, the use of server-side triggered cache policies provides additional advantages. The major work done by the Control Plane is classifying new flows. Another way to offload more cycles from it is to recognize that once the Control Plane has carefully examined a new flow and decided it is a given traffic class, it is likely that the next new flow to the same server IP address and port is also likely to be the same traffic class. Because the Data Plane caches this possibly expensive determination and applies it to subsequent new flows (within a reasonable time) made to the same port on the same server host, much duplicate work is eliminated from the Control Plane, allowing it to handle more new flows per minute. Furthermore, server-side triggered policies also facilitates the application of policies and other operations, such as tunneling and protocol acceleration, where it is desirable to begin with the first packet of the data flow.

D. Data Plane Flow and Partition Processing

Network processing unit 300 also implements bandwidth enforcement functionality to partition bandwidth among data flows. In particular implementations, the bandwidth enforcement and partition scheduling functionality described herein operates separately for each traffic direction. As noted above, network processing unit 300 includes a scheduler or work order module 318, in some embodiments. In embodiments that use the Cavium NPU, this work order module 318 might comprise the work order module described in U.S. Patent Application Publication No. 2006/0056406, entitled "Packet Queuing, Scheduling, and Ordering", which includes a hardware data structure for the ordered and synchronized processing of atomic entries in a FIFO work-queue in parallel. In particular embodiments, the process described below might make use of this hardware data structure in program modules that execute on the NPU's multiple processors. In particular implementations, a work order module 318 schedules work entries for multiple processor cores in a manner where a data structure labeled atomic is operated on by one processor at any given time.

The work order module 318 implements hardware work queuing, hardware work scheduling and tag-based synchronization and ordering to queue and schedule work for the processors. A work queue entry may be added to a work queue by the packet input unit 214 for each packet arrival, and by other processes, such as a processor core executing a partition task. The work queue entry is the primary descriptor that describes work to be performed by the cores Work is defined to be any task to be performed by a core that is identified by an entry on a work queue. The task can include packet processing operations, for example, packet processing operations (such as identifying flow objects, and partition scheduling operations) to be performed on a received packet identified by a work queue entry on a work queue. Each separate packet processing operation is a piece of the work to be performed by a core on the received packet stored in memory. The work order module selects (i.e. schedules) work for a processor and returns a pointer to the work queue entry that describes the work to the processor. Each work entry may have a tag. The tag can be used by the processor to order and synchronize the scheduled work. The tag includes a tag value and a tag type. The tag type indicates how the work is synchronized and ordered. There are three different tag types: ordered (ordering is guaranteed), atomic (ordering and atomicity are guaranteed) and null (no ordering is guaranteed.) A core accesses a data structure (or has a tag) atomically when no other cores can simultaneously access the same data structure. Thus, atomicity guarantees that at most one core has a given tag. The initial tag associated with the work is dependent on the originator of the work.

The work order module 318 may also include a timer unit used to schedule work for the processors. The timer unit, in one implementation, manages rings having a programmable number of buckets stored in a level 2 cache memory or DRAM. Each bucket stores a list of timer entries. Each timer entry stores a work queue entry pointer. The time period between buckets in each ring is programmable. At each periodic bucket time expiration, the next bucket in the ring is processed and the work defined by the work queue entry pointers stored in the timer entries in the bucket is scheduled.

A processor requests work from work order module 318. Typically, the processor polls the work order module 318 to find work. However, in some cases the work order module 318 can be selected to interrupt the core when it has work for the core. The work order module 318, in one implementation, selects or schedules the work to the core based on the groups from which the core accepts work.

Some embodiments might associate a packet with a work-queue entry and use the entry's 32-bit tag (which can be labeled "atomic") as an index into an array of partitions (e.g., where a partition might be a struct or class), each of which includes the tag/index of its parent partition, if any (e.g., as a field in a struct or a data member of a data object). Then, in order to transfer a packet from a partition to its parent (or to transfer a newly-arrived packet to its initial partition), a process might receive a work-queue entry corresponding to a packet from the work queue, perform one or more operations on the partition data structure associated with the atomic tag, identify the atomic tag associated with the parent partition, and add the work-queue entry, modified to include the atomic tag of the parent partition, back onto the work queue maintained by the work order module when it, for example, passes the packet from a child partition to a parent partition. Here it will be appreciated that if two or more work-queue entries have the same tag, only one work entry having that tag can be processed by the NPU's processors at one point in time, according to a particular embodiments of the ordered and synchronized processing described above. In particular implementations, when a processor forwards a packet to a parent partition, it accesses a routine that returns the tag of the parent partition. A work entry including the identified tag is then modified to include this tag and submitted to the work order module.

As discussed above, packets received at the data plane are associated with corresponding data flows based on source and destination attributes of the flow. In a particular implementation, the network processing unit hardware, when it receives a packet on a network interface, reserves memory in a packet buffer space, allocates a work queue entry, and adds a pointer to the received packet stored in the buffer to the work queue entry. The data plane hardware may map a tuple of packet attributes to a tag, which is also added to the work queue entry. As discussed above, this tuple of packet attributes may map to a flow data structure stored in the memory. This flow data structure may identify one or more bandwidth policies, such as a partition and/or a priority. When this work entry is provided to a processor, the processor may map the packet to a partition; the processor may also map the packet to a priority. Still further, for new flows, the data plane may sample one or more packets of a given data flow to the Control Plane, which classifies the data flow and assigns one or more policies (such as a partition and a priority). For such new flows, a default or cached partition may be identified for the data flow. Still further, after a data flow for a given packet has been identified, the network processor stores the work queue entry for the packet in a flow queue. If the queue for the data flow was empty, the processor changes the tag of the work queue entry to the tag corresponding to the partition and re-submits the work entry to the work order module 318. As discussed below, the work order module distributes work entries to processors to perform processes related to the partitions, such as re-configuring the partition or passing a packet to a parent partition.

The partition initially assigned to packet of a data flow may be a leaf partition or a non-leaf partition. The priority indicates the packets priority relative to other packets. In one implementation, each partition comprises N partition queues, where N is the number of priority levels that can be assigned. In one implementation, packets placed on a higher priority queue are selected for processing, relative to a given partition, before lower priority queues. In other implementations, weighted fair queuing algorithms can be used to arbitrate among the priority queues. In some implementations, to promote fairness among data flows, only one packet of a given data flow is processed in the hierarchical partition configuration at a given time. In such embodiments, a work queue-entry (or token packet) might include a pointer to a FIFO flow queue which is accessed to process the next packet in the data flow after the work-queue entry corresponding to a data flow has passed through the root partition.

Figure 13:
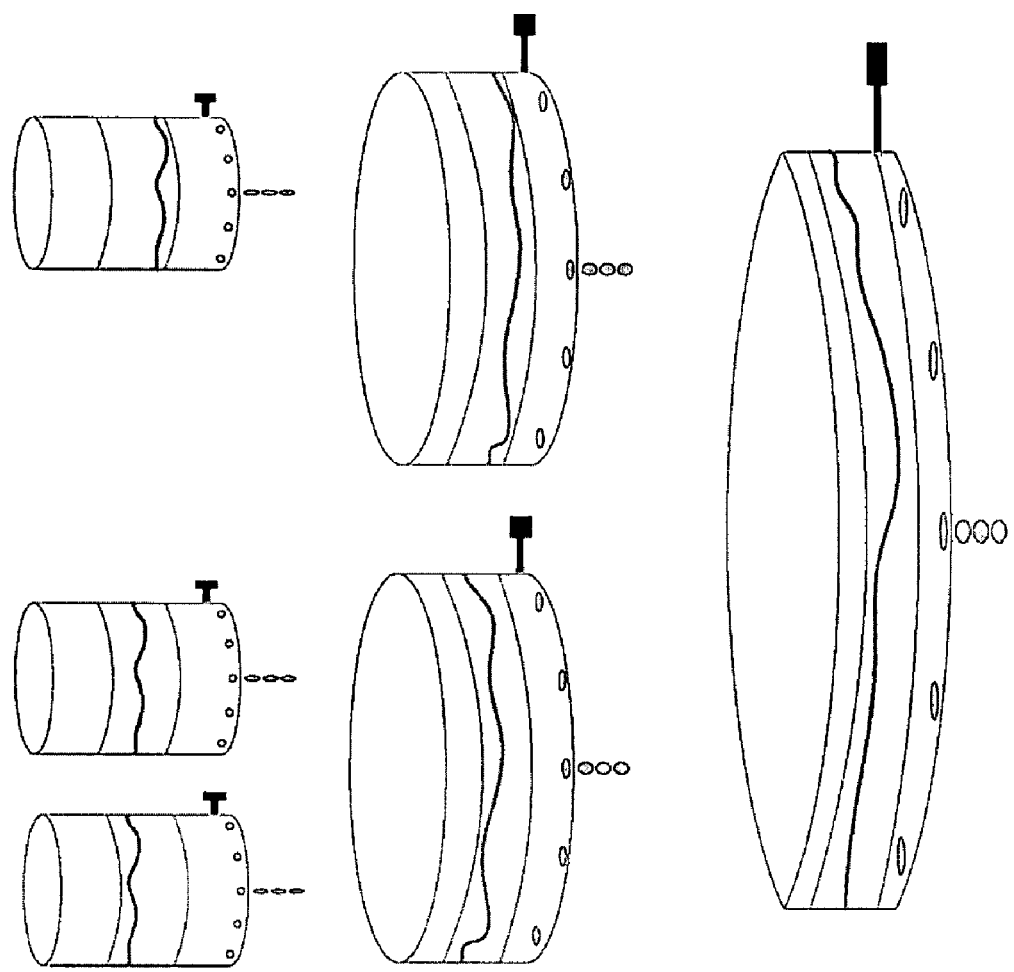
FIG. 13 is a schematic diagram graphically illustrating a hierarchical token bucket scheduling mechanism.

Some embodiments of that system utilize a partition tree implemented as a hierarchy of independent token buckets, where each partition is a bucket which releases packets at its assigned bandwidth rate and the lowest bucket in the hierarchy is the root partition (e.g., inbound or outbound). In these embodiments, one might think of each bucket as having a "control knob" and as having a "high water mark" and a "low water mark", which represent configured minimum and maximum settings. In these embodiments, a bucket regularly suggests a target rate to its children. Each of the children will use the suggested target rate provided it is between the child's configured minimum and maximum settings. Since all children receive the same target rate, bandwidth can be fairly shared between them. FIG. 13 is a schematic diagram showing such a hierarchy of buckets, which hierarchy might be used with some embodiments of the present invention.

Further, in some embodiments, the bucket hierarchy uses tokens, with each partition starting with enough tokens to forward N (such as 2) full size packets. Whenever a partition has a packet that it cannot forward immediately due to insufficient tokens, the partition sets a timer for a small period of time (e.g., using a hardware timer). The hardware has a mechanism that, when the timer expires, returns the work entry to a processor for execution. Upon receiving the work entry, the processor implementing the partition determines how many tokens it can add to its bucket and resumes forwarding packets if the added tokens are sufficient to do so. However, other embodiments night employ a leaky bucket algorithm, rather than a token bucket algorithm, to control target rate in conjunction with a hardware timer.

It will be appreciated that such a bucket hierarchy and the partition-centric processing described herein is advantageous for several reasons. A non-root partition is independent insofar as it can autonomously reset its "rate knob" to its parent's current suggested child target rate. This avoids the need do walk-through of the partition tree, resetting all rate knobs at the same time. Moreover, when a partition is configured, it is given an index for its parent. The partition can quickly verify that the index remains valid, before "dripping" a packet down to its parent. If the index is not valid, the partition might use the default root partition and request reprogramming from the control plane. Moreover, the bucket hierarchy prevents CPU cycles from being wasted on update processing for partitions that are not currently receiving traffic.

Figure 10:
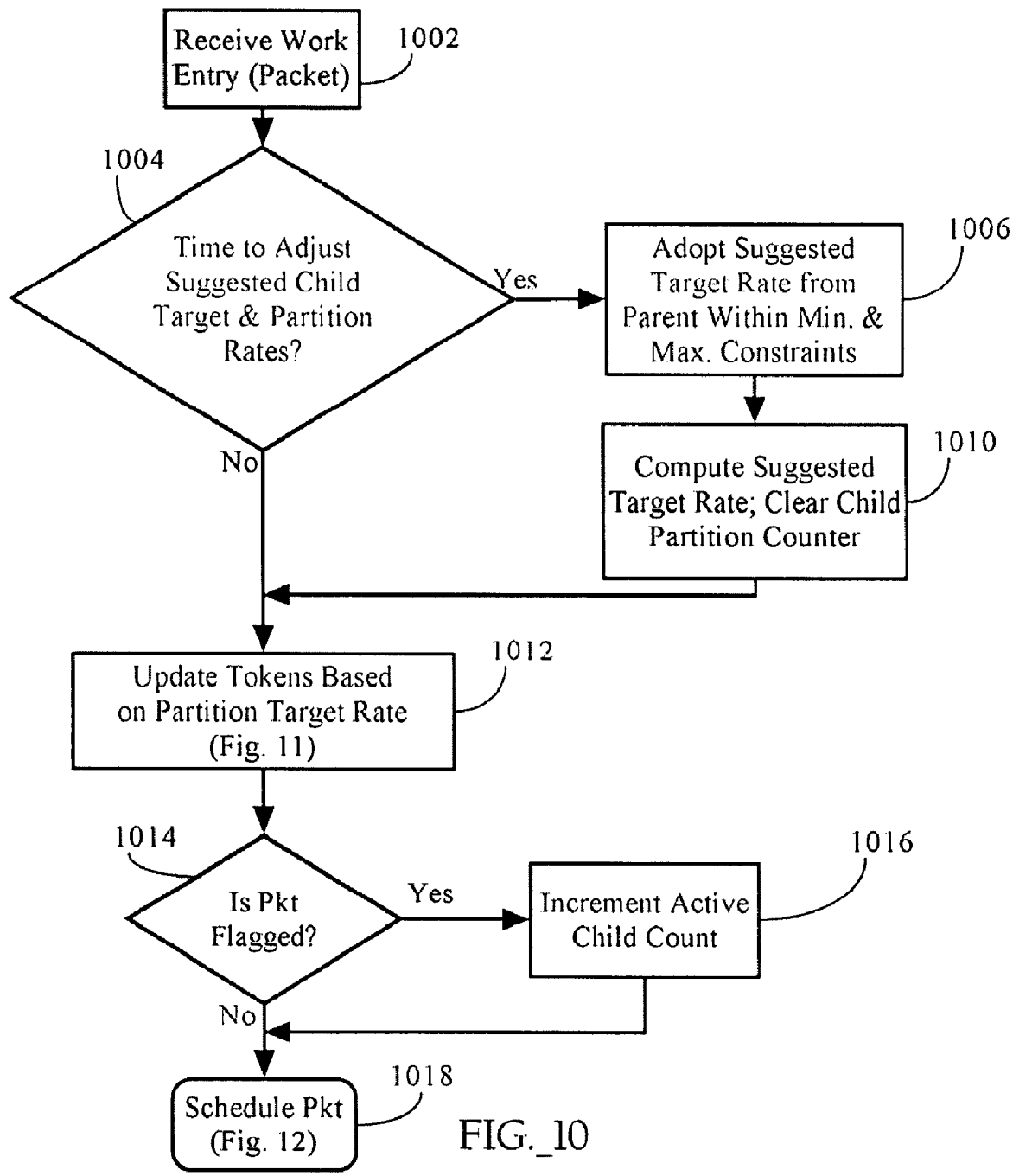
FIG. 10 is a diagram showing a flowchart of a process for passing a packet from a child partition to a parent partition or port, which process might be used with some embodiments of the present invention.

FIG. 10 is a diagram showing a flowchart of a process for passing a packet from a first partition to a parent partition or a port, which process might be used with some embodiments of the present invention. It will be appreciated that the process shown in FIG. 10 might run on one or more processors of a multiprocessor network processor unit in the data plane. The process flow illustrated in FIG. 10 is executed in connection with a work entry transmitted to a processor core of the multi-core network processing un-it. Processor cores perform the process on a partition identified in the work entry and request more work entries from the work order module. In addition to work entries that cause packets to traverse partitions, other work entries may include jobs that cause a processor core to change the configuration of a partition (such as minimum and maximum bandwidth parameters, parent child relationships). In some implementations, these work entries include tags that correspond to the respective partitions on which they operate. It will be appreciated that using the same work order synchronization mechanism for scheduling and configuration of a partition allows altering the partition tree programming without locking the entire or substantial portions of the tree or using other software synchronization mechanisms that could potentially stall packet processing.

In the process's first step 1002, the partition receives a packet from a child partition in the form of a work entry removed from a work queue such as the work queue provided by the work order module of the network processor unit. Alternatively, the partition might be the initial partition, such as a leaf partition, associated with a data flow, in which case it will receive the packet (i.e., in the form of a work entry) as a packet from a process that associates packets to data flows and adds packets to flow queues (see above). The partition process then goes to step 1004, where a conditional operation is performed. Specifically, the partition process periodically adjusts its target rate and also computes a new suggested target rate for child partitions. In one implementation, at initialization of the network processing unit 300, a task is created that is called at a periodic time interval (such as 1 second). At each periodic time interval, the task is called to increment a global heart beat counter. The partition processes, responsive to detected changes in the heart beat counter, compute new suggested target rates for their respective child partitions (1010) and, for non-root partitions, adopt the child target rate suggested by respective parent partitions within minimum and maximum bandwidth constraints (1006). As discussed below, a partition maintains a count of its active child partitions by incrementing a counter each time a work entry for a packet is flagged with a reserved bit. Child partition processes are configured to set this flag for only one packet after the global counter increments. In this manner, the parent partition estimates the number of active child partitions by accessing the child counter at the global counter interval, which essentially is a count of the child partitions active over the previous interval. In one implementation, the child counter is reset at each global counter interval (1010).

To compute a suggested child target rate, the partition process divides its target rate by the number of active child partitions (as indicated by the child counter value). In addition, for non-root partitions, the partition process checks the target rate suggested by its parent partition and conditionally adopts it, setting the partition rate to the minimum rate if the suggested is lower than the configured range, or the maximum rate if the suggested rate is higher than the configured range. The partition process then adds tokens to its bucket based on the current target rate for that partition (1012), see below. If the packet is flagged as the first packet from that child partition during the predefined time interval (1014), the partition process increments an active child partition counter (1016) and then schedules the packet for transmission (1018) (see also FIG. 12).

In another implementation, the computation of a suggested target rate for child partitions further accounts for the amount of data stored in a queue for the partition. A partition's "size" is the maximum number of bytes it is allowed to queue. This should normally be adjusted for the partition's configured maximum rate, and it is based on a system's resource allocation scheme. In one implementation, each partition is allowed to store up to 1 second of traffic (gMaxPartitionDelay) at its maximum rate. So, a partition with a 1 mbps maximum rate (ptn->pMaxRate) would be allowed to store 125 Kbytes (ptn-> pMaxBytesQueued) (1 million bits/8 bits-per-byte*1 second). A low water mark (ptn->pLowWaterBytes) for the partition can be defined as ⅓ of the size of the partition (ptn->pMaxBytesQueued), while a high water mark (ptn-> pHighWaterBytes) can be set to ⅔ of the size of the partition. Other high and low water levels can be used. When a packet is received, the partition process drops the packet if the amount of queued data (ptn->pBytesQueued) resulting from adding the packet would exceed the size of the partition. Otherwise, the partition process adds the number of bytes in the packet (packet->length) to ptn->pBytesQueued. When a packet is forwarded, the partition process subtracts packet->length from ptn->pBytesQueued. The following pseudo-code illustrates how a partition may determine the suggested child target rate based on the amount of queued data for the partition. This determination, as above, is computed at each heartbeat or rate adjustment interval.

```
oldSuggestedTargetRate = ptn->pChildTargetRate;
newSuggestedTargetRate = ptn->pTargetRate / ptn->pNumChildren;
newSuggestedRate = (oldSuggestedTargetRate +
newSuggestedTargetRate) / 2;
if (partition is full) {
        newSuggestedRate = newSuggestedRate / 2;
}
else if (partition is above high water mark) {
        If (partition is filling up (more full than last interval)) {
                newSuggestedRate = newSuggestedRate * 0.8;
        } else if (partition is emptying (less full than last interval)) {
                newSuggestedRate = newSuggestedRate * 0.95;
        }
}
else if (partition is between high and low water mark) {
        If (partition is filling up) {
                newSuggestedRate = newSuggestedRate * 0.99;
        } else if (partition is emptying) {
                newSuggestedRate = newSuggestedRate * 1.01;
        }
}
else if (partition is below low water mark) {
        If (partition is filling up) {
                newSuggestedRate = newSuggestedRate * 1.05;
        } else if (partition is emptying) {
                newSuggestedRate = newSuggestedRate * 1.2;
        }
}
else {
        // partition is empty
        newSuggestedRate = newSuggestedRate * 1.25;
}
ptn->pChildTargetRate = newSuggestedRate;
```

By using the foregoing algorithm, the partition can manage its own children and its queued backlog while still forwarding traffic at the rate its parent partition has advised it to use. It will tend to keep the hierarchical partition configuration working efficiently by avoiding partitions either becoming empty or full too often. Of course, the values used to adjust the child target rate can be tuned for the individual application based on a variety of engineering and design considerations.

In a particular implementation, tokens are implemented in each partition as a counter. The counter contains the number of bytes that the partition is allowed to send without pausing. The counter does not go below zero and, in some implementations, is capped at a maximum number. When a partition is created, it is given a configured amount of "tokens", and its initial update timestamp is set.

```
ptn->pLastUpdated    = eonGetClockCount( );
ptn->pBytesAllowed   = PTN_STARTUP_BYTES_ALLOWED;
ptn->pMaxBytesAllowed =  2 * (pip->maxbw / 8);
```

This notes that the partition was last updated at the current clock count. It is given a starting number of bytes it can send (PTN_STARTUP_BYTES_ALLOWED, in one implementation, 6000 bytes). It also has a maximum token credit limit based on its maximum configured bandwidth setting. So, for a partition with a maximum rate setting (pip->maxbw) of 100 mbps, for example, the maximum bytes the partition accumulates would be 25,000,000 bytes, which would drain in 2 seconds at the maximum rate.

Figure 11:
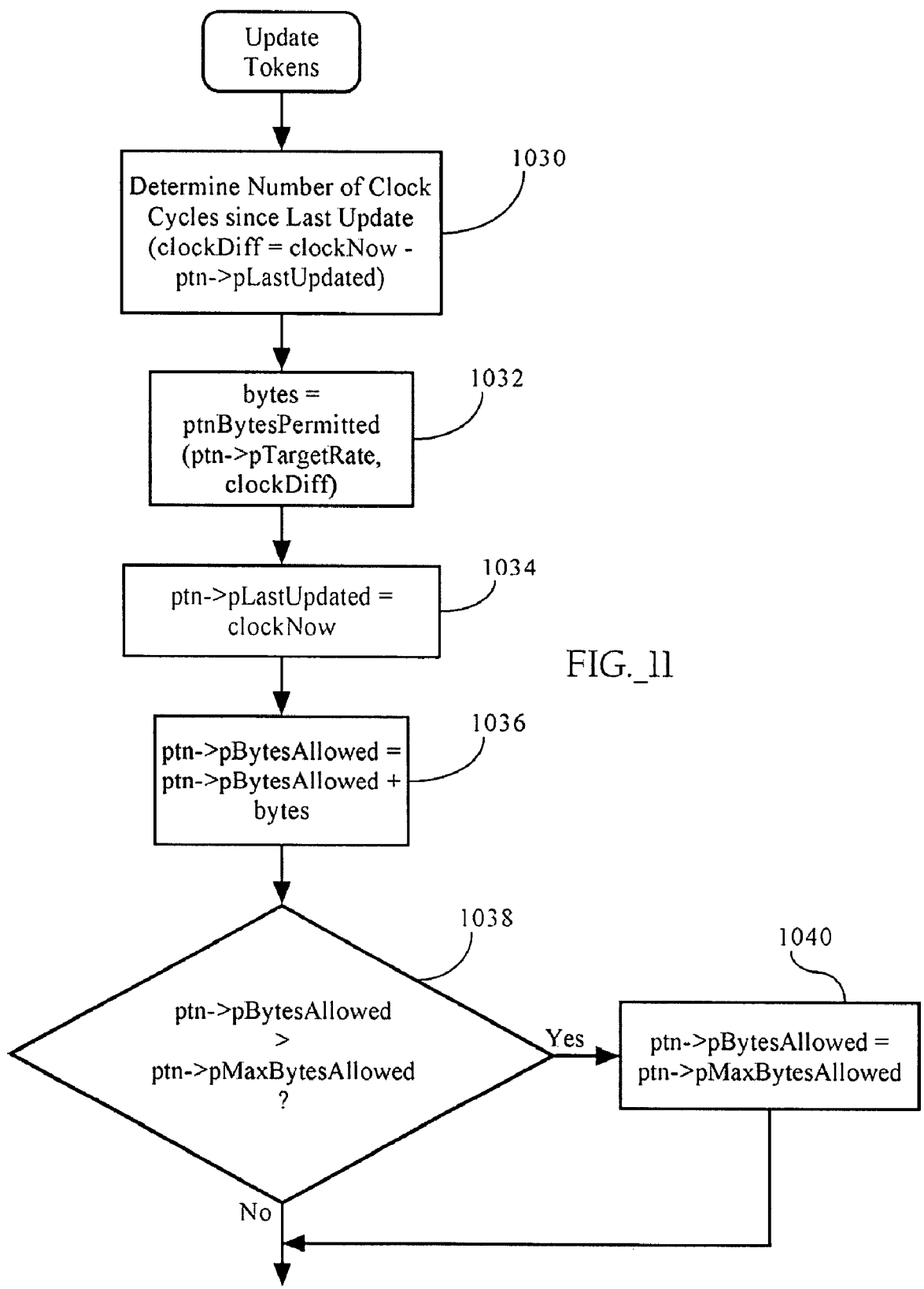
FIG. 11 is a flow chart illustrating an example method directed to updating a token count for a partition.

FIG. 11 illustrates a method according to one implementation for updating the tokens for a partition. Every time the partition is activated, it updates its own token counter, based on its current target rate. In a particular implementation, it determines how many clock cycles have passed since it was last updated, then it adds in the correct number of new tokens, and it finally checks to make sure it isn't exceeding the allowed limit. As FIG. 11 illustrates, the partition process first determines the number of clock cycles since the last update, where clockNow=eonGetClockCount( ) and clockDiff=clockNow−ptn->pLastUpdated (1030). The partition process then computes the amount of bytes that could be transmitted in the clockdiff time interval based on the current target rate (ptn->pTargetRate) (1032). The partition process then updates the update the time stamp of the partition (ptn->pLastUpdated) (1034) and sets the number of tokens for the partition (ptn->pBytesAlowed) based on the computed number of bytes in step 1032, or the maximum bytes allowed for the partition (ptn->pMaxBytesAllowed) (1036, 1038, 1040).

Figure 12:
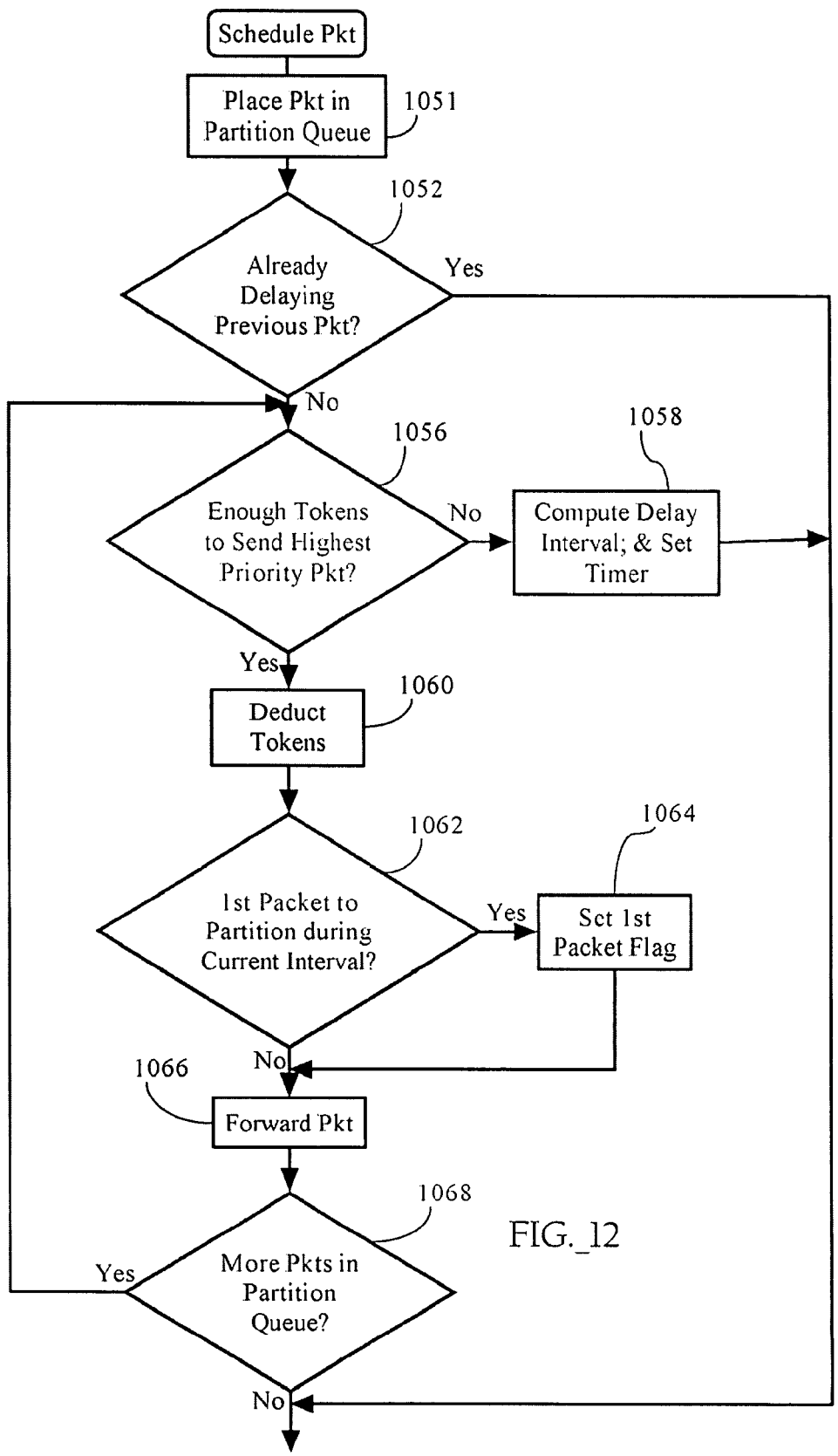
FIG. 12 is a flow chart illustrating an example method directed to scheduling a packet of a partition for forwarding.

FIG. 12 sets forth a method directed to scheduling packets of a partition for transmission to either a parent partition or an interface port. When a partition gets a new packet, it queues the packet in a partition queue (1051) and checks to see if it can send it. In one implementation, a priority determines to which partition queue the packet is added. The first check is to determine if a previous packet has already been delayed (1052). If there are no other previous packets stored on the partition queue (1052), the partition process determines whether sufficient tokes exist to forward the packet (1056). If not, the partition process computes a delay interval and sets a timer based on the computed delay interval (1058). The hardware of the network processor unit, as discussed above, has a mechanism that, when the timer expires, returns the work entry to a processor for execution. In one implementation, the delay interval can be computed based on the difference between the size of the packet (packet->length) and the current number of tokens [bytesNeeded=packet->length−ptn->pBytesAllowed], and the current target rate. In one implementation, the delay interval is computed by dividing the number of bytes (tokens) needed to transmit by the current target rate. In another implementation, however, the delay interval can be tuned for the speed of the networks involved. For example, rather than setting up many very short timers that are triggered at short intervals, a longer delay that causes timers to be triggered less frequently can be used. In a multi-gigabit system, such delays are not usually noticeable, and are more efficient for the system to implement. In a particular implementation, if the partition needs (bytesNeeded) less than 2000 bytes, the delay is set, based on the current target rate (ptn->pTargetRate), to allow 2000 bytes (tokens) to be accumulated. In a large system with many partitions, this can be more efficient.

As FIG. 12 illustrates, however, if the partition has enough tokens to send the packet (1056), the partition process deducts tokens from the partition based on the size of the packet (packet->length) (1060), conditionally setting a packet flag if the packet is the first packet forwarded since the last rate update interval (1062, 1064), and forwards the packet to the next partition or port (if the current partition is a root partition) (1066). In one implementation, the partition process can attempt to empty its partition queue (1068) if sufficient tokens exist (1056).

To forward a packet to a parent partition (1026), the partition process accesses a routine that returns the tag corresponding to the parent partition, modifies the work entry for the packet to add the parent partition tag, and resubmits the work entry to the work order module 318. If the partition process currently implements a root partition process, it forwards the packet to a process, by transmitting the work entry, that causes the packet to be transmitted from a network interface. For root partitions, the partition process schedules the packets for transmission from a network interface. When the packet is transmitted, the work entry for the packet is transmitted back to the flow queuing process that deletes the packet from the buffer, and checks whether another packet work entry is stored in the flow queue. If so, the flow queuing process, as discussed above, changes the tag to the initial partition tag, causing the packet to be processed through the hierarchical partition configuration described above and ultimately scheduled for transmission. The embodiments described above can be configured to achieve a number of advantages. For example, since a partition process can be implemented to forward packets without accessing data structures of other partitions (other than to check for suggested rates of parent partitions), the processing described above can be implemented in a multi-processor environment in an efficient manner, such as without software locking or other delay-inducing methods.

In some implementations, the root partition may be implemented by a set of partition processes with different tags. It will be appreciated that a root partition can become a bottleneck since every packet must pass through it. So to prevent such a bottleneck, a particular embodiment employs a technique called "root spreading". In this technique, a root partition is implemented as a set of k (for example, 4) "ghost partitions", where each ghost partition comprises 1/k of the total or maximum bandwidth in a given network traffic direction, inbound or outbound, of the root partition. Using this technique, up to 2*k processors in an NPU might be able to simultaneously work on root partition tasks, instead of 2 (i.e., one processor for the inbound root partition and one for the outbound root partition), for a given full-duplex access link. When a child partition passes a packet to a parent partition (1066), it looks up the atomic tag of the parent, accessing a routine that normally returns a tag. For root partitions, however, each processor, in reserved memory, maintains counters and other information directed to looking up a tag to be used to access a given ghost partition corresponding to the root. In one implementation, each time a processor looks up a tag for a root partition, the processor accesses a counter, c, and increments it. The processor then takes c modulo k which, in connection with the direction (inbound or outbound) indexes to one of the 2*k ghost root partitions to use. The processor then modifies the work entry for the packet to include the tag corresponding to the ghost root partition which is resubmitted to the work order module 318.

E. Beltway Mechanism to Reduce Overhead Associated with Atomic Scheduling

As discussed above, the partition scheduling process, viewed as a whole, is implemented by a plurality of processors operating on a sequence of work queue entries, and relies on the work order module 318 to provide for atomic access to shared data structures when necessary. There are a number of other processes or operations that also require atomic access to shared data structures. Such operations are typically much smaller operations, such as writing a packet to an output port of a network interface, or setting a timer. Indeed, the partition scheduling process discussed above utilizes these operations. For example, execution of the root partition process results in a packet being written onto a hardware queue of a network interface or output port. The output port hardware operates to separately transmit the packet. Furthermore, the partition scheduling processes also rely in some instances on hardware-based timers, as well.

Access to hardware resources (such as output ports, timers, compression modules, etc.) are somewhat constrained in multiple processor environments. More specifically, hardware resources are often accessed via a defined set of registers (e.g., configuration and status registers (CSRs)) and command buffers, which may be accessed by only one processor at a time. For example, a network port is accessible via a set of registers, to which a processor is provided atomic access. To write a packet onto a given output port, a processor typically accesses a command buffer to write one or more commands and packet pointers, and writes commands (e.g., operation codes or opcodes) to configuration and status registers. Atomic access to these registers and command buffers is required because another processor should not be able to write commands these registers or command buffers during execution of a current operation. Other examples are hardware-based timers or compression units. In a multiple processor environment, the processors, and possible other processing units (e.g., regular expression engines, etc.) essentially compete for access to the hardware registers and command buffers used for various functions, such as writing packets to output ports, setting the timers, or compressing packets.

Using spin locks to control access to shared data structures on such hardware facilities is inefficient and can lead to significant throughput degradations in systems incorporating large number of processors operating in parallel. The work order module 318 does have facilities that may be utilized to provide for atomic access to such data structures, as discussed above. Use of such facilities, however, comes with a cost. Specifically, there is overhead associated with obtaining work queue entry buffers, storing data in a work queue entry, submitting the work queue entry to the work order module 318, as well as receiving new work queue entries from the work order module 318. While this overhead is acceptable for processes that perform a number of operations in connection with a single work queue entry, this is inefficient for smaller operations (such as setting timers, passing packets to compression logic, etc.).

The following describes a so-called beltway mechanism that takes advantage of atomic locking mechanisms supported by certain classes of hardware processors, such as the work order module 318 discussed above, to handle the tasks that require atomic access to data structures without wasting processor cycles spinning while also reducing the overhead associated with these atomic locking mechanisms. The beltway mechanisms described herein can be used to control access to software and hardware facilities in an efficient manner.

As an overview, the beltway mechanism can be implemented around a given task, such as writing packets to a specific output port or specific group of output ports, setting a hardware-based timer, using hardware-based compression logic, etc. An instance of a beltway data structure is created for each such task. Relative to each task, the beltway data structure includes a set of circular buffers or rings, and global variables that point to consumer processes or contain state information of the particular beltway instance. In the implementation described herein, the number of circular buffers or rings of a given beltway instance equals the number of processors of the data plane hardware. Of course, the number of processors and corresponding circular buffers may be limited by configuration parameters. In addition, so-called producer functions add entries to the beltway data structure, while a so-called consumer process reads entry from the beltway data structure and calls a consumer function associated with the beltway data structure for processing of the entry.

Figure 14:
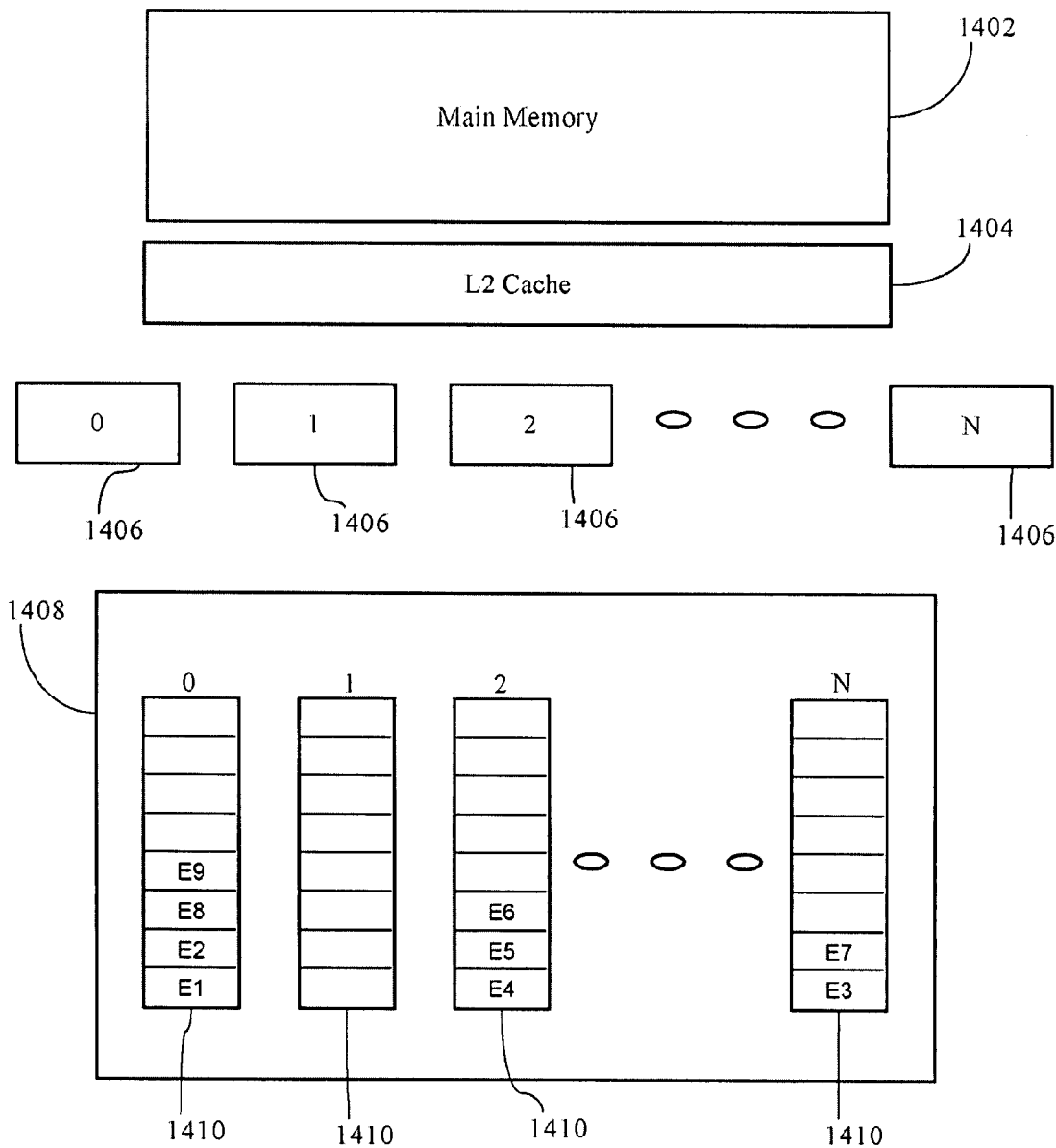
FIG. 14 is a functional block diagram illustrating an example relationship between various hardware components of a data plane and the components of a beltway data structure.

FIG. 14 is a functional block diagram illustrating the relationship between a beltway data structure 1408 and the number of processors (N) 1406. In the data plane 300, discussed above, each processor 1406 includes L1 or on-chip cache memory. The data plane 300 further includes main memory 1402 and L2 cache memory 1404 shared by processors 1406. The beltway data structure 1408 includes circular buffers or rings 1410 for corresponding ones of the processors. As discussed in more detail below, when a particular processor 1406 executes a process that results in adding an entry to a given beltway data structure, the entry is added to the circular buffer that corresponds to that processor. Accordingly, entries added by processor 1 would be stored on circular buffer 1. Each beltway data structure 1408 is maintained in main memory 1402 and accessible by each of the processors 1406. Of course, at run time, portions or all of a given beltway data structure may also be stored in L2 cache memory 1404, as well as the L1 caches of each processor 1406.

E.1. Beltway Data Structures

As discussed above, a beltway data structure 1408 includes N circular buffers (rings) for corresponding ones of the N processors, as well as global variables, the types of which may vary depending on the type of task to which the beltway is applied (writing to output port, timers, compression, etc.). The following object definition provides a beltway data structure according to one possible implementation:

```
typedef struct __BeltType {
    BeltConsumerFunction    consumer;
    int32_t                 max;
    int32_t                 size;
    int32_t                 limit;
    bool                    scheduled;
    int64_t                 did;
    int64_t                 ran;
    BeltQueue               queues[kMaxProcessors];
} BeltType, *BeltTypePtr;
```

BeltConsmerFunction points to the function that consumes entries in the circular buffers of the beltway data structure, and provides access to a resource, such as a hardware output port or group of hardware output ports. In a particular implementation, each consumer function has exclusive access to a given resource or group of resources, such that there is a 1 to 1 relationship between a given beltway data structure and a corresponding resource or group of resources. The max variable defines the maximum size of each circular buffer of the beltway data structure, while the size variable defines the size of each entry in the circular buffers. The limit variable defines the maximum number of entries a consumer process can consume in a given circular buffer before moving on to another circular buffer in the same beltway data structure. The scheduled variable is a Boolean indicating whether the beltway data structure has been scheduled for processing (e.g., whether a work queue entry for the beltway module has been added to the atomic scheduling process). The variable queues [ ] is an array of the circular buffers of the beltway module in main memory 1402.

Additionally, the circular buffers can be defined by the following object definition:

```
typedef struct __BeltQueue {
    MinimalWorkQueueEntry    wq;
    VoidPtr                  ring;
    int32_t                  first;
    int32_t                  last;
} BeltQueue, *BeltQueuePtr;
```

In this implementation, the ring variable contains the starting memory address (e.g., a 64-bit pointer) reserved for the circular buffer in main memory. The first variable contains the offset (relative to the ring variable) corresponding to the first entry in the circular buffer to be read, while the last variable is the offset (relative to the ring variable) points to the entry following the last entry to be read in the circular buffer. As discussed below, the size variable defining the size of each entry is used to increment the first and last variables, as needed, when entries are read from or written to a given circular buffer. In a particular implementation, the first and last variables are defined relative to the ring variable as the origin. For example, the first memory space of the circular buffer is zero. According to this convention, if the last entry were the third memory space relative to the ring, the last variable would be set to the product of two times the size variable. The wq variable stores a work queue entry that a given processor, when executing a producer function, may use when submitting a work queue entry to the work order module 318 in order to schedule execution of a consumer process.

Each entry in a circular buffer can comprise a set of commands specific to the type of task to which a given beltway data structure is associated. For example, the following object definition shows the structure of an entry for passing packets to an output port:

```
typedef struct __OutputBeltEntry {
    CycleTime           time;
    int                 queue;
    OutputCommandWord   command;
    WorkQueueEntryPtr   work;
    BufferHandle        packet;
} OutputBeltEntry, *OutputBeltEntryPtr;
```

In the foregoing code section, the time variable indicates the current clock counter maintained by the data plane hardware. The queue variable identifies to which port queue supported by the output port the packet should be written. The command variable identifies a command or operation code associated with transmission of the packet. The work variable is a work queue entry returned to the calling function when the transmit operation is complete. The packet variable identifies the memory address of the buffer space storing the packet. In some implementations, a single consumer function can be configured to access a group of output ports, such as 4 output ports.

Other entry data structures can be defined for other tasks. For example, the following objects define an entry structure for setting a hardware timer:

```
typedef union __TimerWorkEntry {
    WorkQueueEntry      w;
    struct __t {
        uint64_t        wqe[4];
        CycleTime       deadline;
        uint8_t         cancelled;
        uint8_t         istimer;
        uint64_t        ocation :50;
        umt8_t          packet_data[80];
    } t;
} TimerWorkEntry, *TimerWorkEntryPtr;
typedef struct __TimerBeltEntry {
    CycleTime           when;
    TimerWorkEntryPtr   work;
} TimerBeltEntry, *TimerBeltEntryPtr;
```

In the foregoing, TimerBeltEntry is the entry stored in the circular buffer and includes a when variable, and a work variable that points to a work queue entry stored in a buffer in main memory. The when variable indicates the clock cycle or time value at which point the work queue entry identified in the work variable should be returned by the timer hardware.

Still further, an entry structure for a compression task may be defined as follows:

```
typedef struct __CompressBeltEntry {
    WorkQueueEntryPtr   work;
    uint8_t             compress;
    uint16_t            dataOffset;
    uint16_t            dataLength;
} CompressBeltEntry, *CompressBeltEntryPtr;
```

The work variable, as above, identifies a pointer to commands and data used by the hardware compression logic to compress the data. The compress variable contains a command, such as compress, or decompress, used to instruct the compression unit. The work variable identifies a work queue pointer that is returned to the calling function when the packet compression operation is completed. In one implementation, it further points to the input buffer that stores the packet to be compressed or decompressed. The dataOffset variable identifies the starting point within the packet where the compression or decompression operation should be performed, while the, while the datalength variable indicates (in bytes) the length of the data block to be compressed or decompressed.

As one skilled in the art will recognize, the foregoing are examples purely for didactic purposes. The type, length and structure of each entry can vary considerably and will depend on the type of task, and the application programming or other interfaces used to access the particular functionality.

In a particular implementation, an initialization function or process can create instances of beltway data structures, allocating memory resources as necessary, in response to commands issued by an application, such as during a system start up or recovery process. These commands can identify a beltway type (e.g., output port, compression, timer), and a hardware resource, such as an output port, or a group of similar hardware resources, such as a group of output ports to be associated with a given instance of a beltway data structure. In other implementations, the hardware resource or group of hardware resources can be associated with a function (consumer) that is operative to access such resource(s).

E.2. Producer and Consumer Processes

As mentioned above, a producer function, when called, adds entries to a beltway data structure, while a consumer process reads entries from a beltway data structure in order to process the entries. The consumer process and producer functions, in one implementation, are embodied as processor readable instructions stored in memory that the processors may execute. A producer function may be called in connection with execution of another process. For example, the root partition process described above in Section D may call a producer function to pass a packet to an output port for transmission. Additionally, the partition processes described above may call a producer function to set a hardware-based timer. Producer functions executed by multiple processors may add entries to the same beltway data structure. The facilities of the data plane hardware handle memory coherence tasks associated with writing entries to memory.

Figure 15:
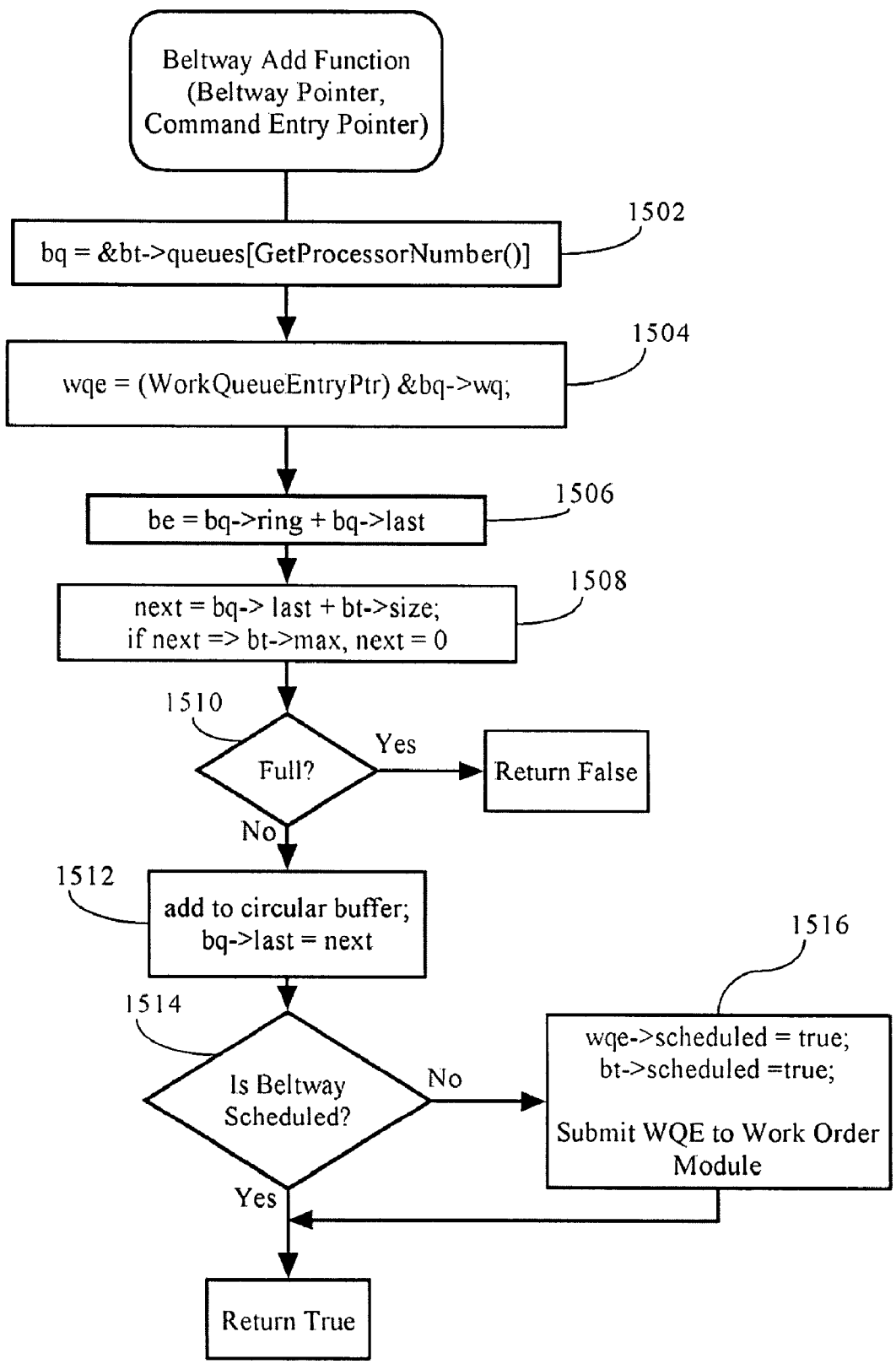
FIG. 15 is a flow chart illustrating an example process for adding command entries to a beltway data structure.

FIG. 15 illustrates a process flow associated with adding an entry to a beltway data structure according to one possible implementation of the invention. The beltway add function receives as input parameters a pointer to a beltway data structure that corresponds to the task or resource to be accessed, and a pointer to command data stored in a stack or other memory location. The beltway add function identifies a circular buffer, and corresponding memory address of the circular buffer (bq), based on the processor currently executing the beltway add function (GetProcessorNumber) (1502). For example, assuming that processor 1 calls the beltway add function in connection with writing a packet from a root partition to an output port, the circular buffer, and the memory address of the circular buffer, corresponding to processor 1 is identified. The beltway add function obtains the memory address (wqe) for a work queue entry (bq->wq) required to schedule a consumer process with the work order module 318 (1504). The beltway add function then identifies the memory address (be) of the last entry in the circular buffer based on the starting memory address of the circular buffer (bq->ring) and the last variable (bq->last) (1506). The beltway add function computes a next variable by incrementing bq->last by the size of each entry (bt->size) (1508). If the result is greater than the maximum size of the buffer, next is set to zero. The beltway add function then determines whether the circular buffer is full by comparing the next variable to the first variable (bq->first) corresponding to the circular buffer. If the circular buffer is full (1510), the beltway add function returns "false" as an indicator to the calling process to allow it to perform error handling operations or a retry. If the circular buffer is not full, the beltway add function copies the contents of the beltway command indicated at the location of the command entry pointer to the next memory space of the circular buffer, and sets the last variable (bq->last) to next (1512). The beltway add function then accesses the global state variables (bt->scheduled & wqe->scheduled) of the beltway data structure to determine whether a consumer process has been scheduled (1514). If a consumer process for the beltway data structure has not been scheduled, the beltway add function sets both bt->scheduled & wqe->scheduled variables to true, and submits a work queue entry to the work order module 318 to start a consumer process (1516). In a particular implementation, a tag identifying the work queue entry as atomic is added. Eventually, a processor will pick up the work queue entry from the work order module 318 and execute a consumer process, such as the consumer process described below.

Figure 16:
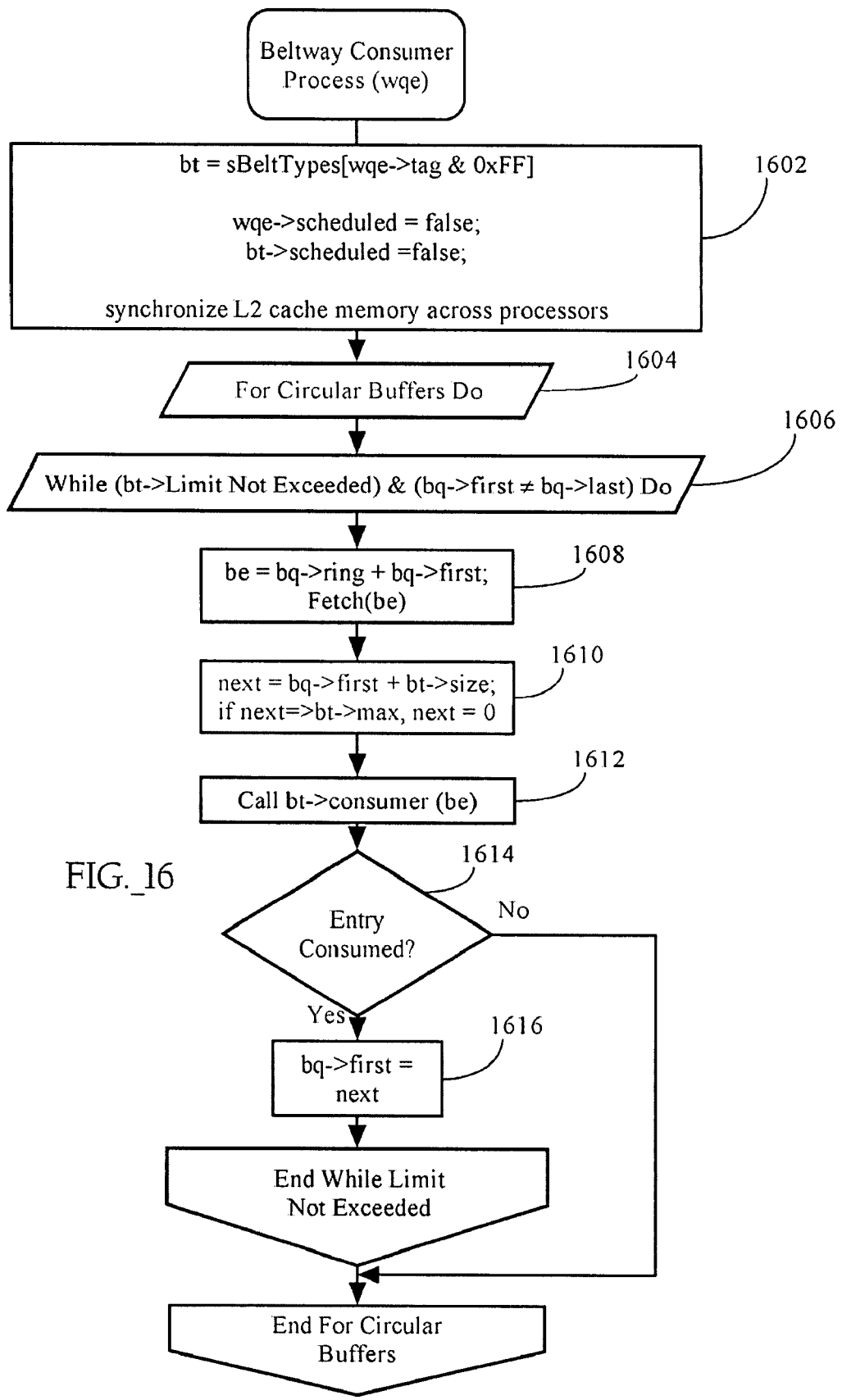
FIG. 16 is a flow chart illustrating an example process for reading and processing command entries from a beltway data structure

FIG. 16 illustrates a consumer process according to one implementation of the invention. In the implementation shown, a processor, when it executes a consumer process, accesses a given beltway and, within certain optional constraints, attempts to process entries across the circular buffers of the beltway data structure. As discussed above, the consumer process, relative to a given beltway data structure, is labeled as atomic to ensure that no other processor picks up a consumer process implicating the same beltway data structure. In the implementation shown, the beltway consumer process receives a work queue entry (wqe) from the work order module 318. The beltway consumer process identifies the beltway data structure based on the atomic tag of the work queue entry (wqe->tag) (in one implementation, by looking at the low order byte of the tag (ANDing tag with 0xFF) (1602). The beltway consumer process also resets certain state variables (bt->scheduled & wqe->scheduled) to false, and synchronizes these state variables across the N processors. Setting these variables to false causes subsequently called producer functions to submit a work queue entry to the work order module 318, as discussed above. The beltway consumer process then processes the entries, if any, contained in each circular buffer (1604). As to each circular buffer (bq), the beltway consumer process sets the memory address (be) of the circular buffer to be read (bq->ring +bq->first), and fetches the entry at the defined memory address (1608). The beltway consumer process also computes the next variable by incrementing the first variable (bq->first) by the size of the buffer entry (bt->size), setting next to zero if a wrap around occurs (1610). The beltway consumer process then calls or accesses the consumer function (bt->consumer) associated with the beltway data structure, passing the memory address of the entry (1612). In some implementations, this access may be an attempted access to a set of hardware registers, such as configuration and status registers of a hardware output port or a timer mechanism. If the entry is not consumed (1614), the beltway consumer process leaves the entry on the circular buffer and proceeds to the next circular buffer. If the entry is consumed, the beltway consumer process sets the first entry (bq->first) to the next variable computed above (1610, 1616). As FIG. 16 illustrates, the beltway consumer process may process additional entries in the same circular buffer until the buffer is empty (bq->first==bq->last) or a configured limit (bt->limit) on the number of entries that can be processed is exceeded (1606). In this manner, a given processor may sequentially process a plurality of command entries in a given beltway data structure in response to a single work queue entry provided by the work order module 318. If command entries remain in the beltway data structure after a first pass through the circular buffers, the beltway consumer process may either make additional passes through the circular buffers, or resubmit a work queue entry to the work order module 318.

Other implementations are possible. For example, each beltway entry may include a time stamp, such as a clock counter value. The beltway consumer process may be configured to select entries based on the time stamps, rather than the round-robin arbitration described above. For example, the beltway consumer process may select a circular buffer with an entry having the lowest time stamp, process the entry, and scan for the next entry across the beltway data structure with the lowest time stamp.

Given that a single processor has exclusive access to the portions of the beltway data structure relevant to the consumer process and that a single beltway data structure is exclusively associated with a hardware resource or group of hardware resources, atomic access to these resources is also ensured to the command entries while reducing overhead associated with the work order module 318. That is, during higher demand situations, the beltway data structure for a given task may store a number of command operations that are executed by a consumer process in response to a single work queue entry provided by the work order module 318 in step 1514 illustrated in FIG. 15. Indeed, as demand increases, more command operations are performed for each work queue entry maintained by the work order module 318. Furthermore, processes, such as partition processes, access resources indirectly via a corresponding beltway data structure, as opposed to directly accessing the resource directly. For example, to set a timer, a process would call the beltway add function, as opposed to accessing the timer registers directly. Given that beltway add function operates only to add entries, one or more of the processors may continue to add entries, while another processor executes a consumer process or while the work order module 318 continues to buffer the work queue entry for the consumer process.

Particular embodiments of the above-described process might be comprised of instructions that are stored on storage media. The instructions might be retrieved and executed by a processing system. The instructions are operational when executed by the processing system to direct the processing system to operate in accord with the present invention. Some examples of instructions are software, program code, firmware, and microcode. Some examples of storage media are memory devices, tape, disks, integrated circuits, and servers. The term "processing system" refers to a single processing device or a group of inter-operational processing devices. Some examples of processing devices are integrated circuits and logic circuitry. Those skilled in the art are familiar with instructions, storage media, and processing systems.

Those skilled in the art will appreciate variations of the above-described embodiments that fall within the scope of the invention. In this regard, it will be appreciated that there are many possible orderings of the steps in the process described above and many possible modularizations of those orderings. Further, in embodiments where processing speed is not determinative, the process might run in the control plane rather than the data plane. As a result, the invention is not limited to the specific examples and illustrations discussed above, but only by the following claims and their equivalents.

What is claimed is:

1. An apparatus comprising
   N processors, where N is greater than 1;
   a work order module operative to provide work queue entries to the N processors, wherein the work queue entries correspond to respective tasks, and to provide, to a given processor of the N processors, exclusive access to one or more shared data structures for work queue entries including atomic tags;

a memory operative to store one or more instances of a beltway data structure, each instance of a beltway data structure comprising N circular buffers for corresponding ones of the N processors, wherein the N circular buffers each comprise a plurality of entries; the memory further operative to store processor-readable instructions for a beltway producer function and a beltway consumer process;

wherein the beltway producer function includes instructions operative to cause the N processors, when executing the beltway producer function, to
add entries to corresponding ones of the circular buffers of an identified instance of a beltway data structure;
conditionally submit work queue entries to the work order module including an atomic tag associated with the identified instance of the beltway data structure; and wherein the beltway consumer process includes instructions operative to cause a processor of the N processors, responsive to a work queue entry identifying the beltway consumer process and an atomic tag corresponding to the instance of a beltway data structure, to:
identify the instance of the beltway data structure based on one or more attributes of the work queue entry;
read entries from the circular buffers of the identified instance of the beltway data structure; and
call a consumer function associated with the identified instance of the beltway data structure to process the read entries.

2. The apparatus of claim 1 wherein the work order module is operative to
maintain a queue of work entries, one or more of the work entries including an atomic tag; and
schedule work entries in the queue for the N processors such that only a single processor of the N processors is provided a work entry labeled with a given atomic tag.

3. The apparatus of claim 1 wherein submitting work queue entries to the work order module is conditioned on whether a previous work queue entry for a consumer process for the identified instance of the beltway data structure is currently maintained by the work order module.

4. The apparatus of claim 1 wherein the beltway consumer process further comprises instructions operative to cause a processor of the N processors to arbitrate among the circular buffers in a round robin arbitration scheme.

5. The apparatus of claim 4 wherein the beltway consumer process further comprises instructions operative to cause a processor of the N processors to read up to a limited number of entries in a given circular buffer before proceeding to a next circular buffer during the round robin arbitration scheme.

6. The apparatus of claim 1 wherein entries of the beltway data structure are associated with time stamps each corresponding to a time when a given entry is added, and wherein the beltway consumer process further comprises instructions operative to cause a processor of the N processors to select entries across the circular buffers of the beltway data structure based on the time stamps.

7. The apparatus of claim 1 further comprising an output port, and wherein the consumer function is operative to write data onto the output port.

8. The apparatus of claim 1 further comprising hardware timer logic, and wherein the consumer function is operative to access and send commands to the hardware tinier logic.

9. The apparatus of claim 1 further comprising hardware compression logic, and wherein the consumer function is operative to access and send commands to the hardware compression logic.

10. The apparatus of claim 1 wherein the consumer function is operative to exclusively access a first hardware resource.

11. The apparatus of claim 10 wherein the first hardware resource comprises one or more registers.

12. The apparatus of claim 1 wherein the consumer function is operative to exclusively access a plurality of hardware resources.

13. The apparatus of claim 1 further comprising one or more network interfaces; and wherein the memory is further operative to define a hierarchical partition configuration, the hierarchical partition configuration comprising a plurality of partitions, the memory further operative to buffer packets received at the one or more network interfaces;
wherein the N processors, to schedule packets for transmission according to the hierarchical partition configuration, are each operative to:
receive, from the work order module, an indication of a first work entry, wherein the first work entry is associated with a packet to be processed and includes a tag identifying a partition of the plurality of partitions,
forward the packet corresponding to the first work entry to a parent partition of the identified partition by modifying the first work entry to include a tag of the parent partition,
resubmit the first modified work entry to the work order module, and
call, if the partition associated with the tag is a root partition, the beltway producer function to add an entry to an instance of the beltway data structure associated with a network interface to schedule a packet for transmission from the network interface.

14. The apparatus according to claim 13, wherein the plurality of processors are further operative to
add tokens to a token bucket associated with the partition associated with the tag based on a target rate associated with the partition and a last token update time;
conditionally forward the packet to the parent partition based on a size of the packet and a current number of tokens in the token bucket of the partition associated with the tag; and
deduct, responsive to forwarding the packet, tokens from the token bucket of the partition associated with the tag.

15. The apparatus according to claim 14 wherein the plurality of processors are further operative to
place the packet on a partition queue if a number of tokens in the token bucket of the partition associated with the tag is insufficient to transmit the packet; and
compute a delay time based on the target rate of the partition and the size of the packet;
call the beltway producer function with a command operative to set a timer for the delay time, wherein the timer, when triggered, is operative to return the work entry identifying the partition associated with the tag to the corresponding processor.

16. A method comprising
maintaining a queue of work queue entries in a work order module, one or more of the work queue entries including a tag, wherein the work order module is operative to schedule work queue entries in the queue for N processors, wherein N is greater than 1, such that only a single processor of the N processors is provided a work queue entry labeled with a given tag;

storing, in a memory, one or more instances of a beltway data structure, each instance of a beltway data structure comprising N circular buffers (rings) for corresponding ones of the N processors, wherein the N circular buffers each comprise a plurality of entries;

executing a beltway producer function operative to
add entries to corresponding ones of the circular buffers of an identified instance of a beltway data structure;
conditionally submit work queue entries to the work order module including a tag associated with the identified instance of the beltway data structure; and
executing, responsive to a work queue entry identifying a beltway consumer process and a tag corresponding to the instance of a beltway data structure, a beltway consumer process on a select processor of the N processors, the beltway consumer process operative to:
identify the instance of the beltway data structure based on one or more attributes of the work queue entry;
read entries from the circular buffers of the identified instance of the beltway data structure; and
call a consumer function associated with the identified instance of the beltway data structure to process the read entries.

17. The method of claim 16 wherein submitting work queue entries to the work order module is conditioned on whether a previous work queue entry for a consumer process for the identified instance of the beltway data structure is currently maintained by the work order module.

18. The method of claim 16 wherein the beltway consumer process is further operative to cause a processor of the N processors to arbitrate among the circular buffers in a round robin arbitration scheme.

19. The method of claim 18 wherein the beltway consumer process is further operative to cause a processor of the N processors to read up to a limited number of entries in a given circular buffer before proceeding to a next circular buffer during the round robin arbitration scheme.

20. The method of claim 16 wherein entries of the beltway data structure are associated with time stamps each corresponding to a time when a given entry is added, and wherein the beltway consumer process is further operative to cause a processor of the N processors to select entries across the circular buffers of the beltway data structure based on the time stamps.

* * * * *